United States Patent
Hayakawa

(10) Patent No.: US 9,519,443 B2
(45) Date of Patent: Dec. 13, 2016

(54) PRINT DATA FLATTENING PROCESSING OF SPOT COLOR COMPONENTS WITH ANY HIDDEN SPOT COLOR PORTION REMOVED

(71) Applicant: FUJI XEROX CO., LTD., Minato-ku, Tokyo (JP)

(72) Inventor: Michio Hayakawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/487,271

(22) Filed: Sep. 16, 2014

(65) Prior Publication Data
US 2015/0262046 A1 Sep. 17, 2015

(30) Foreign Application Priority Data
Mar. 14, 2014 (JP) ................. 2014-052566

(51) Int. Cl.
*G06F 3/12* (2006.01)
*G06K 15/02* (2006.01)

(52) U.S. Cl.
CPC ............... *G06F 3/12* (2013.01); *G06K 15/186* (2013.01); *G06K 15/1852* (2013.01); *G06K 15/1856* (2013.01)

(58) Field of Classification Search
None
See application file for complete search history.

(56) References Cited

U.S. PATENT DOCUMENTS

| | | | |
|---|---|---|---|
| 6,456,395 B1* | 9/2002 | Ringness | H04N 1/32128 358/1.18 |
| 2004/0083430 A1* | 4/2004 | Boonen | G06F 17/2264 715/249 |
| 2008/0079977 A1* | 4/2008 | van de Capelle | G06F 3/1205 358/1.13 |
| 2012/0243032 A1* | 9/2012 | Hayakawa | G06K 15/1857 358/1.15 |

FOREIGN PATENT DOCUMENTS

| | | |
|---|---|---|
| JP | 2008-028917 A | 2/2008 |
| JP | 2009-130705 A | 6/2009 |

* cited by examiner

*Primary Examiner* — Christopher D Wait
(74) *Attorney, Agent, or Firm* — Sughrue Mion, PLLC

(57) ABSTRACT

A print data processing apparatus includes the following elements. A spot color memory stores a spot color element. A flattening section performs, when a new image element is input in accordance with a rendering order, flattening processing for separating the new image element into a basic color element having only a basic color component and a spot color element having only a spot color component, for updating a configuration of each spot color element stored in the spot color memory to a configuration from which a portion hidden by a configuration of a newly separated spot color element is removed, and for storing the new spot color element in the spot color memory. An output section outputs, when spot color elements obtained by separating all image elements included in each unit of output are stored in the spot color memory, the spot color elements stored in the spot color memory.

15 Claims, 16 Drawing Sheets

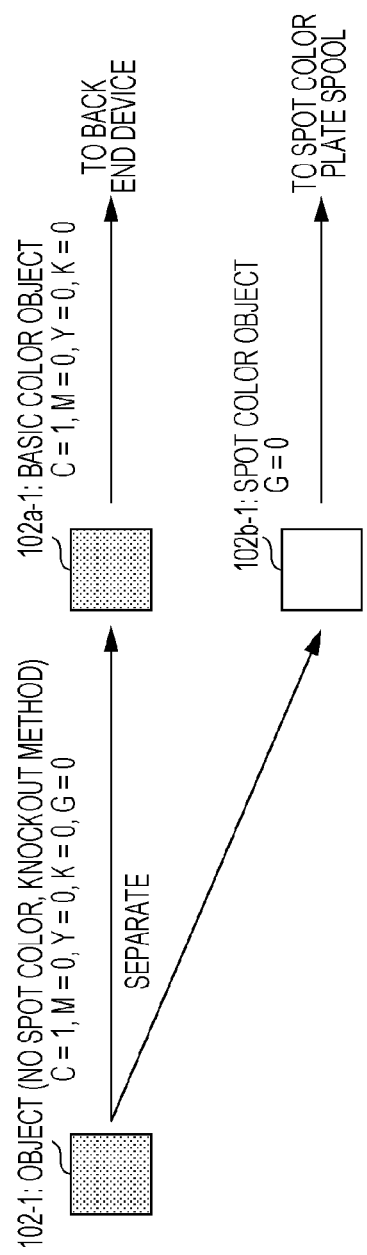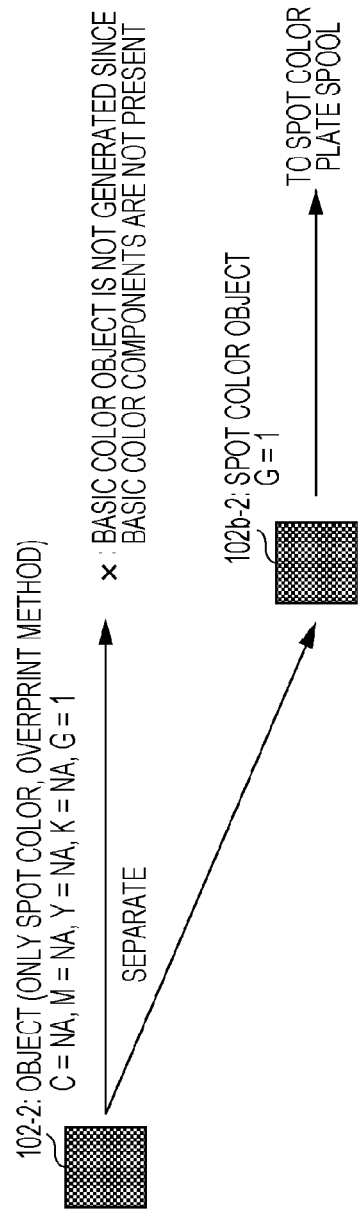

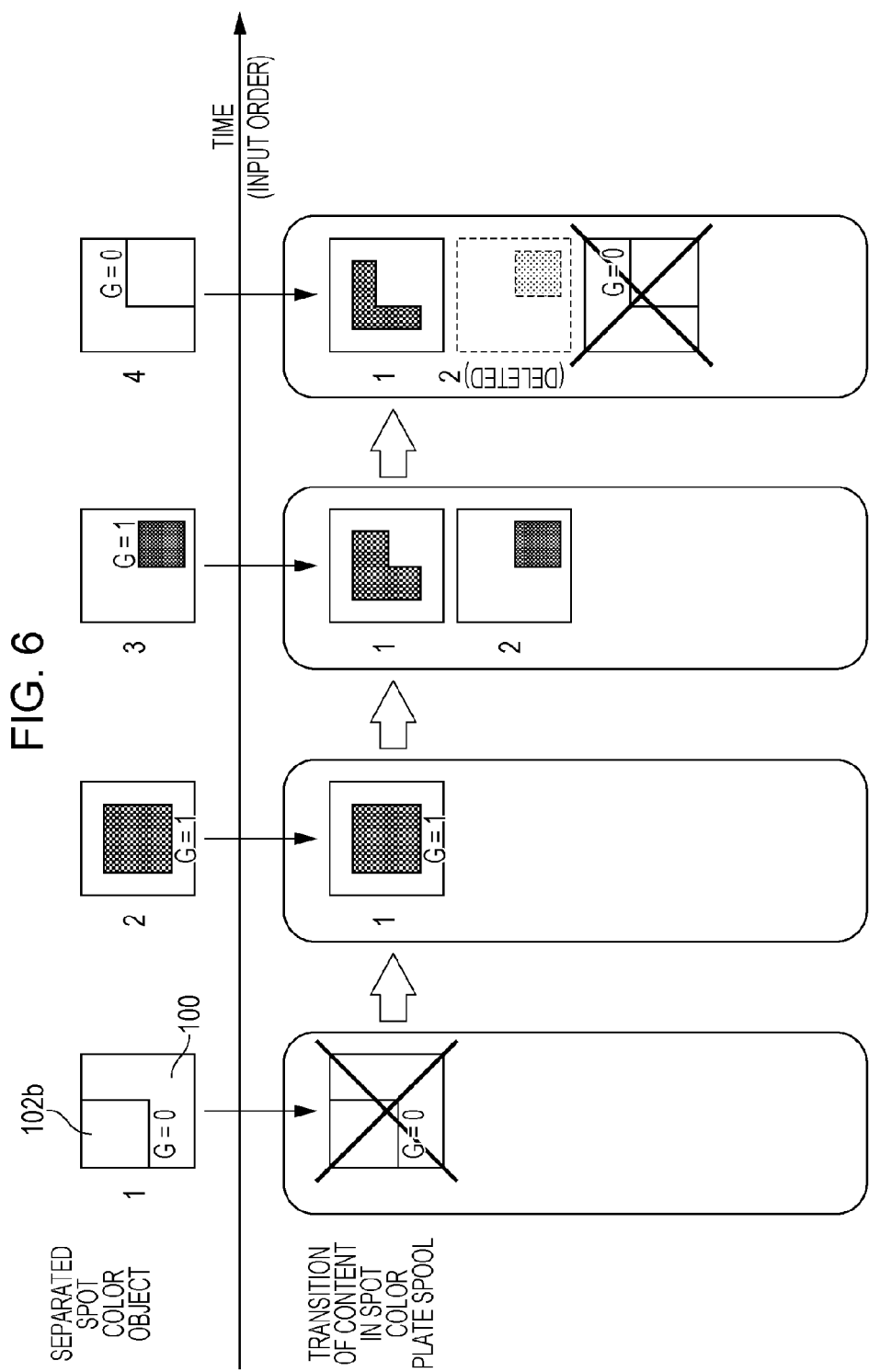

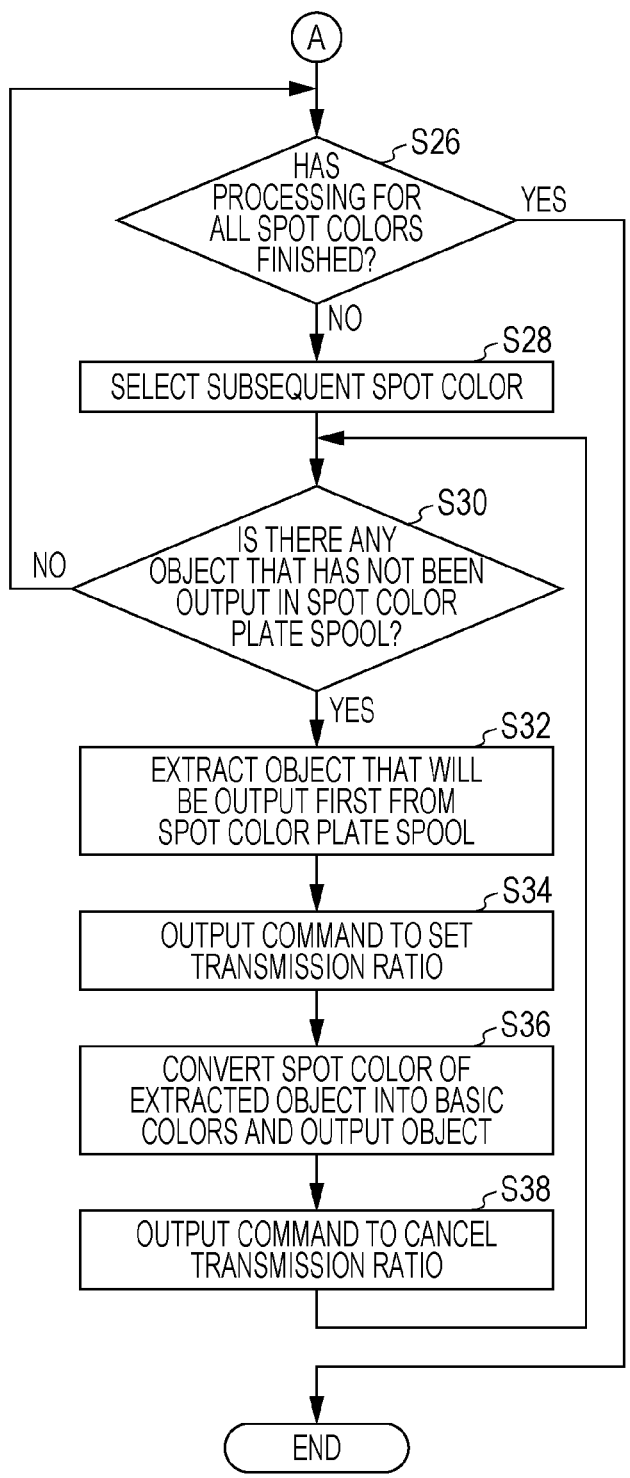

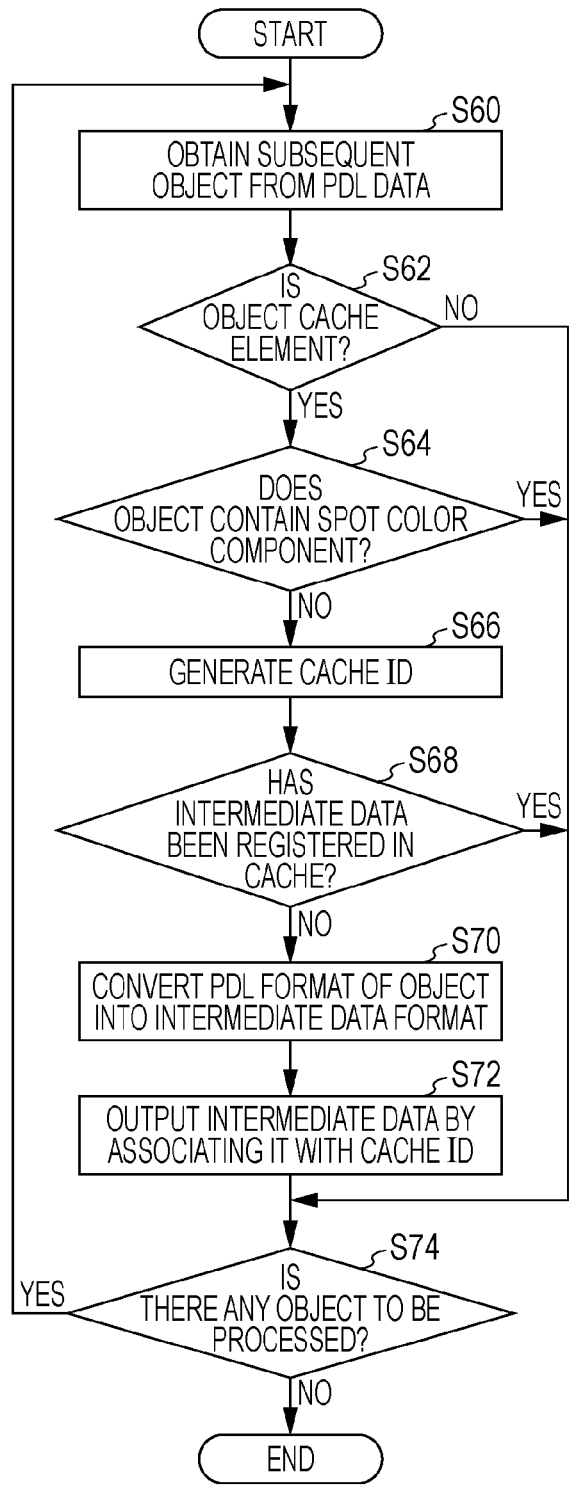

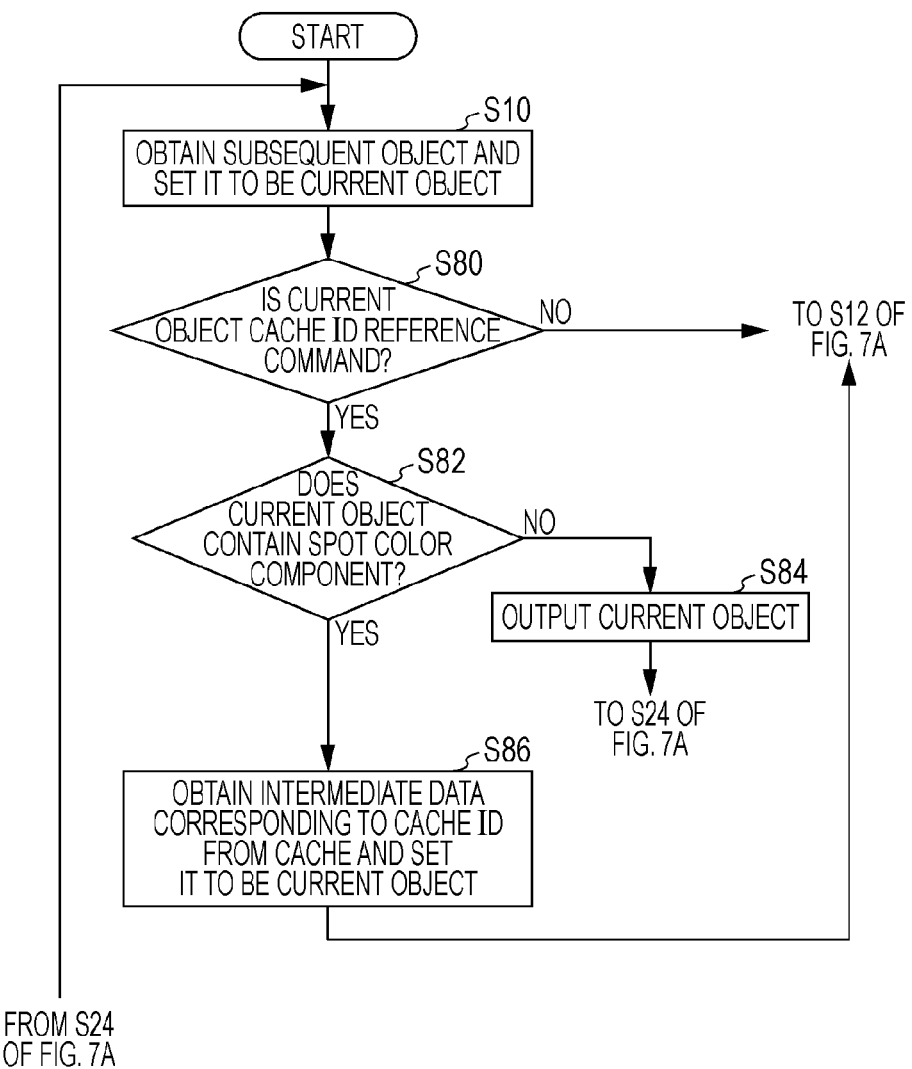

PRINT DATA FLATTENING PROCESSING OF SPOT COLOR COMPONENTS WITH ANY HIDDEN SPOT COLOR PORTION REMOVED

CROSS-REFERENCE TO RELATED APPLICATIONS

This application is based on and claims priority under 35 USC 119 from Japanese Patent Application No. 2014-052566 filed Mar. 14, 2014.

BACKGROUND (i) Technical Field

The present invention relates to a print data processing apparatus and a non-transitory computer readable medium.

(ii) Related Art

In order to deal with an environment in which a toner or ink of a spot color is not available, a spot color is simulated by using a combination of basic colors. One of the issues that may be presented in this simulation concerns processing for an overlapping portion of a spot color object and another spot color object. For example, there may be a case in which the color of an overlapping portion of objects having the same spot color turns out to be different from that obtained when printing is performed by using spot color plates. This issue will be discussed later.

Print data described in a page description language (PDL) is converted into an intermediate data format, and then, data in the intermediate data format is rasterized (converted into a raster format) and printed. In this printing technique, the above-described simulation of a spot color by using basic colors may be performed when PDL data is converted into intermediate data. In this case, an object expressed by a spot color in PDL data is converted into an object group expressed by basic colors (including information concerning a transmission ratio) in intermediate data. The transmission ratio is a ratio at which the color of another object group superposed under this object is transmitted. The objects of the intermediate data are generated in accordance with the order of objects of the PDL data, and the generated objects are subjected to rasterizing processing in this generating order. Accordingly, it is now assumed that the following type of image in the PDL data format is input. A spot color object is superposed on a normal object constituted by only basic colors and another object of the same spot color is further superposed on the superposed object. In this case, this superposing order is also maintained in the intermediate data. Additionally, in the intermediate data, a spot color is represented by basic colors and a transmission ratio. Accordingly, in rasterizing processing for the intermediate data, the basic color components of the first spot color object in the superposing order are combined with an image obtained by rasterizing the normal object in accordance with the transmission ratio, and then, the basic color components of the second spot color object in the superposing order are combined with the resulting raster image (expressed by basic color components) in accordance with the transmission ratio. In this method, the color of an overlapping portion of the objects of the same spot color results in a color obtained by superposing the same spot color twice on the color of the normal object. In actual printing, however, the objects of the same spot color are integrated into one spot color plate, and the color of the overlapping portion of these objects results in, not a color obtained by superposing the same spot color twice, but the spot color itself.

SUMMARY

According to an aspect of the invention, there is provided a print data processing apparatus including the following elements. A spot color memory stores therein, a spot color element, which is an image element that has a spot color component and does not have any basic color component. A flattening section performs, when a new image element is input in accordance with a rendering order, flattening processing for separating the new image element into a basic color element that has a basic color component and does not have any spot color component and a spot color element that has a spot color component and does not have any basic color component, for updating a configuration of each spot color element stored in the spot color memory to a configuration from which a portion of the spot color element hidden by a configuration of a new spot color element separated from the new image element is removed, and for storing the new spot color element in the spot color memory. An output section outputs, when spot color elements obtained by separating all image elements included in each unit of output are stored in the spot color memory, the spot color elements stored in the spot color memory.

BRIEF DESCRIPTION OF THE DRAWINGS

An exemplary embodiment of the present invention will be described in detail based on the following figures, wherein:

FIGS. 5A and 5B illustrate object separation performed by an object color separator;

FIG. 6 illustrates a specific example of the transition of the content of a spot color plate spool;

FIGS. 7A and 7B are flowcharts illustrating an example of a procedure of processing performed by the spot color flattening section;

FIG. 14 is a flowchart illustrating an example of a procedure of processing performed by a cache element interpreter in the second modified example; and FIG. 15 is a flowchart illustrating an example of a procedure of processing performed by a spot color flattening section in a third modified example.

DETAILED DESCRIPTION

[System Configuration of Exemplary Embodiment]

Figure 1:
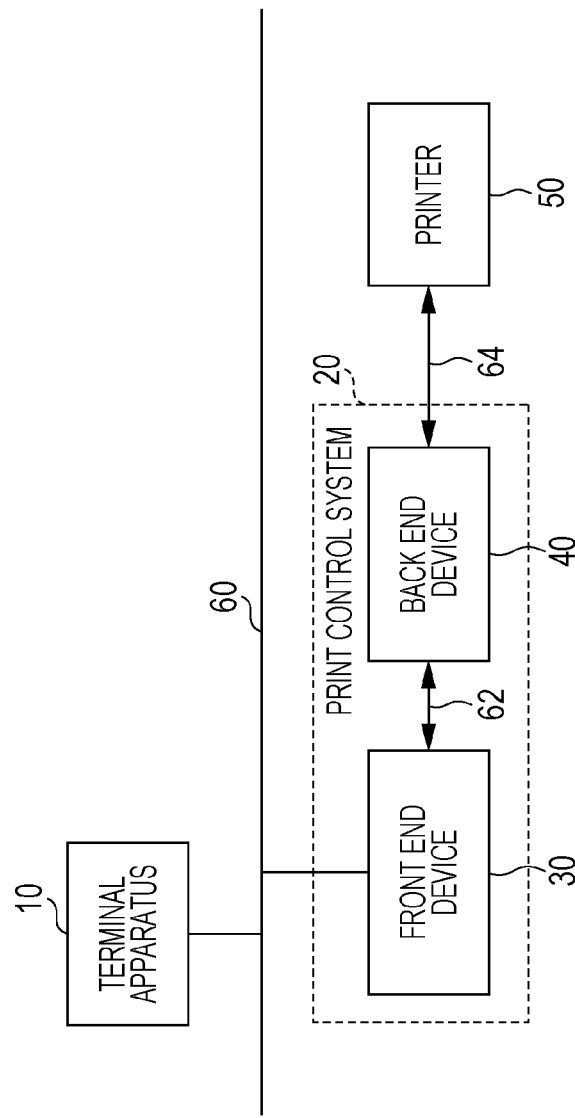
FIG. 1 is a block diagram illustrating an example of the configuration of an image processing system.

FIG. 1 is a block diagram illustrating an example of the configuration of an image processing system. The image processing system includes a terminal apparatus 10, a print control system 20, and a printer 50. The print control system 20 includes a front end device 30 and a back end device 40. The terminal apparatus 10 is connected to the front end device 30 via a communication medium 60, and sends a print job including a document print command to the front end device 30 in response to an instruction from a user. The front end device 30 is connected to the back end device 40 via a communication medium 62, and the back end device 40 is connected to the printer 50 via a communication medium 64.

The communication media 60, 62, and 64 may be data communication networks, such as local area networks (LANs). The communication media 60, 62, and 64 may be the same type of communication medium or may be different types of communication media. For example, a LAN may be used as the communication medium 60 disposed between the terminal apparatus 10 and the front end device 30, and dedicated communication media different from a LAN may be used as the communication medium 62 disposed between the front end device 30 and the back end device 40 and as the communication medium 64 disposed between the back end device 40 and the printer 50.

In the image processing system shown in FIG. 1, a print job sent from the terminal apparatus 10 is processed in the front end device 30, and data indicating results of processing the print job is supplied to the back end device 40. Rendering data (also called raster data) is generated in the back end device 40. Then, printing is performed by the printer 50 in accordance with this rendering data.

Each of the terminal apparatus 10, the front end device 30, and the back end device 40 shown in FIG. 1 may be implemented by, for example, a general-purpose computer. In a circuit configuration of the computer, hardware devices, such as a central processing unit (CPU), a memory (primary storage), various input/output (I/O) interfaces, and a communication interface, are connected to each other via a bus. The computer sends and receives data to and from other devices via the communication interface. Input devices, such as a keyboard and a mouse, and a display device, such as a cathode ray tube (CRT) or a liquid crystal display, are connected to the bus via an I/O interface. A fixed secondary storage device, such as a hard disk drive (HDD) or a solid state drive (SSD), and a disk drive for reading portable non-volatile recording media of various standards, such as a digital versatile disc (DVD) and a flash memory, are connected to a bus via an I/O interface. Such a disk drive serves as an external storage device for the memory. A program describing the content of processing in an exemplary embodiment and modified examples, which will be discussed below, is stored in a fixed storage device, such as an HDD, through the use of a recording medium, such as a compact disc (CD) or a DVD, or via a network, and is installed into the computer. As a result of the CPU executing the program stored in the fixed storage device and read into the memory, the processing in an exemplary embodiment and modified examples, which will be discussed below, is implemented.

In an exemplary embodiment and modified examples, which will be discussed below, some functions of the back end device 40 may be implemented, not by software processing by executing the program, but by hardware processing. Hardware processing may be performed by using a dynamic reconfigurable processor (DRP) in which a circuit is dynamically reconfigurable while processing is being executed. Alternatively, hardware processing may be performed by using a circuit, such as an application specific integrated circuit (ASIC). For example, a hardware element, such as a DRP or an ASIC, that executes some functions of the back end device 40 is configured in advance, and then, it is connected to the bus of a general-purpose computer, thereby implementing the back end device 40.

One specific example of hardware that implements the front end device 30 and the back end device 40 is a blade server. A blade server is constituted by plural information processing apparatuses which each function as a server and are loaded within one housing. More specifically, a blade server is the following server device. A general-purpose computer including a CPU, a memory, and so on, is mounted on a single substrate (blade) and plural blades are loaded within a housing. For example, one blade loaded in the blade server may be used as the front end device 30, and another blade may be used as the back end device 40. Alternatively, each of the front end device 30 and the back end device 40 may be implemented by plural blades loaded in the blade server.

The above-described specific example is only an example, and each of the front end device 30 and the back end device 40 may be constructed in an individual computer loaded in an individual housing. Alternatively, the front end device 30 and the back end device 40 may be constructed in the same computer. That is, a program for executing processing of the front end device 30 and that of the back end device 40 may be executed in the same computer.

The printer 50 is a device that prints an image on a medium, such as paper. The printer 50 may be a continuous-paper printer or a cut-sheet printer. The printing method of the printer 50 is not particularly restricted, and may be an electrophotographic system, an inkjet method, or another method.

Figure 2:
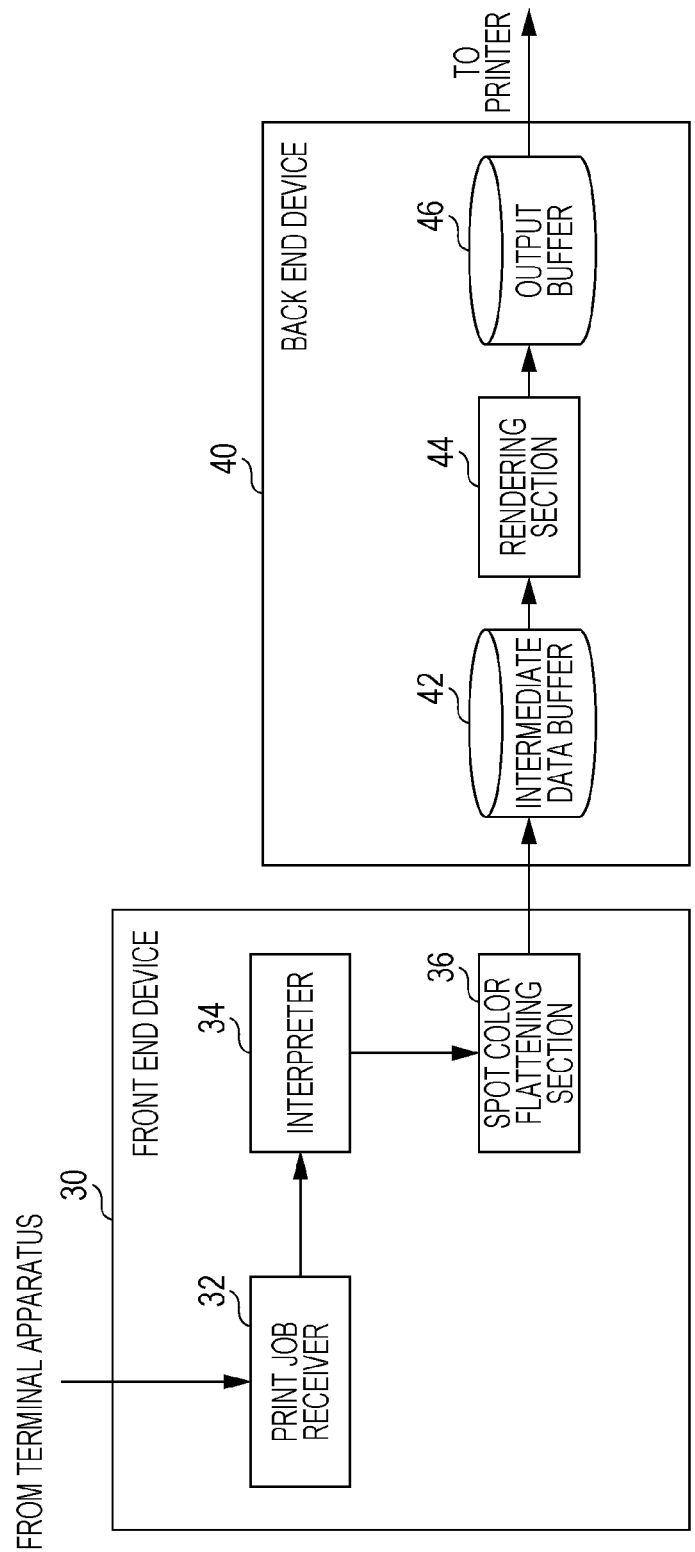
FIG. 2 is a block diagram illustrating an example of the functional configuration of a front end device and that of a back end device included in a print control system.

FIG. 2 illustrates an example of the functional configuration of the front end device 30 and that of the back end device 40 included in the print control system 20. The front end device 30 includes a print job receiver 32, an interpreter 34, and a spot color flattening section 36. The back end device 40 includes an intermediate data buffer 42, a rendering section 44, and an output buffer 46.

The print job receiver 32 of the front end device 30 receives a print job sent from the terminal apparatus 10. In this exemplary embodiment, a print job includes a command to print a document and data indicating a document to be printed described in a page description language (PDL). A PDL is a computer programming language for causing an information processing apparatus to perform display processing, print processing, and so on. Examples of PDLs are PostScript (registered) and portable document format (PDF) (registered). Data described in a PDL includes position information, format information, and color information concerning objects forming a document to be printed, such as characters, figures, and images (bitmap images). Hereinafter, data indicating a document to be printed described in a PDL will be referred to as "PDL data". The print job receiver 32 supplies PDL data included in a received print job to the interpreter 34.

The interpreter 34 interprets the PDL data obtained from the print job receiver 32, and generates intermediate data including an instruction concerning a procedure for generating rendering data in accordance with interpreting results. The interpreter 34 then outputs the generated intermediate data. Rendering data is print image data indicating an image to be printed expressed in a format that can be handled by the printer 50. Raster data is an example of rendering data. Intermediate data is data having a granularity level between PDL data and rendering data. The intermediate data format expresses an image object described in a PDL which is divided into smaller elements having a simple configuration. One example of the intermediate data format is a display list format.

Figure 3:
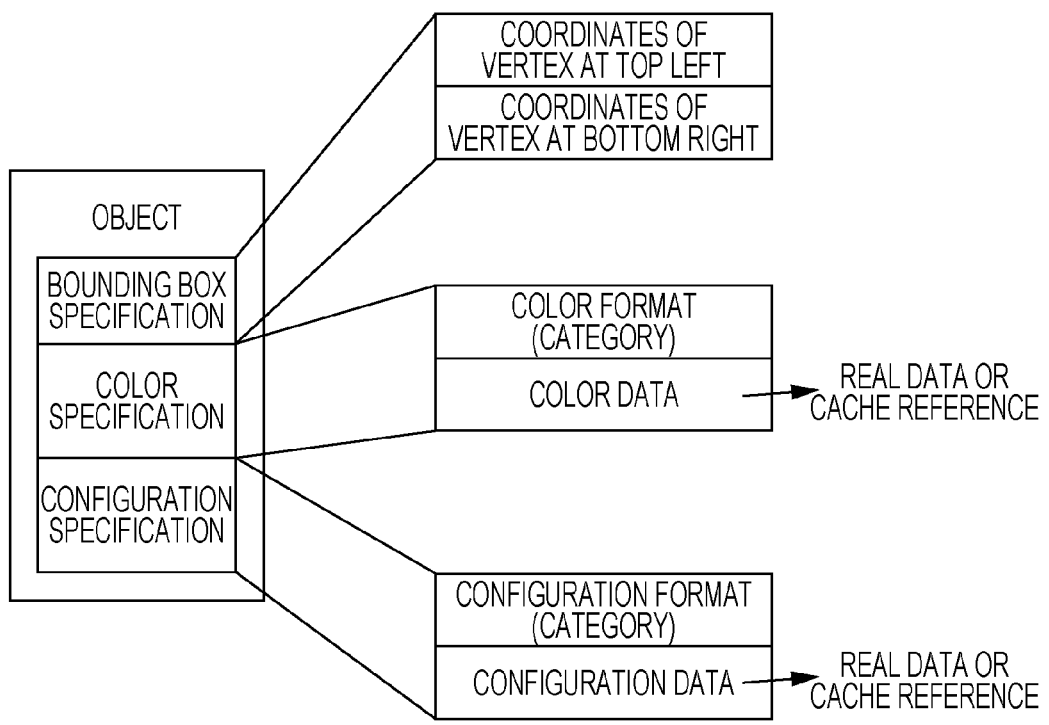
FIG. 3 illustrates an example of a format of an image object in intermediate data.

Another example of the intermediate data format is a format schematically shown in FIG. 3. In the example shown in FIG. 3, an object in the intermediate data format, which is a small element divided from an image object represented by PDL data, is expressed by a set of three data items, such as bounding box specification, color specification, and configuration specification.

Bounding box specification is information that defines a bounding box of the object shown in FIG. 3, that is, a rectangle containing this object (rectangle having sides parallel with the corresponding sides of a page). The bounding box specification indicates information concerning, for example, a set of coordinates of the vertices on the top left and the bottom right of this rectangle.

Color specification is information that defines the color of each pixel forming the object and includes information concerning a color format and color data. The color format is information that defines how the color of each pixel forming this object is determined. Examples of the color format are a single color (for example, all the pixels are expressed by the same color), a gradation (colors are sequentially changed in a direction in which pixels are arranged), and raster (bitmap: color is specified for each pixel). The color data is data representing a color of each pixel in a data format corresponding to the color format. For example, if the color format is a single color, the color data indicates color values of one color expressed by coordinates in a color space of predetermined basic colors (process colors), such as cyan, magenta, yellow, and black (CMYK). If the color format is a spot color, the color data is a name of the spot color. In the case of a spot color, a density value thereof may be specified. If the color format is a gradation, the color data indicates information concerning initial values of colors and a change ratio. If the color format is raster data, color data indicates a color value of each pixel.

Configuration specification is information that defines the configuration of the object, and includes information concerning a configuration format and configuration data. The configuration format is a format representing the configuration of the object, and is, for example, a rectangle format, a run format, or a raster mask format. The configuration data is data indicating the object format in accordance with the configuration format of the object.

Details of the above-described configuration formats will be given below. The rectangle format is a format expressing the configuration of the object by a rectangle which is defined by sides parallel with the corresponding sides of a page. As the configuration data of the rectangle format, a set of coordinates of the vertices on the top left and the bottom right of this rectangle may be used.

The run format is a format expressing the configuration of the object by a set of runs (a run is constituted by continuous pixels having the same pixel value) along a printing main scanning line (generally in a direction perpendicular to a feeding direction of paper when printing is performed). At least one run is included in a main scanning line, and a set of runs forms an object. This may also be described such that rendering is performed on pixels forming each run by using the color (pixel value) determined by the color specification. In other words, pixels which do not belong to runs in a main scanning line are pixels outside the object, and rendering is not performed on such pixels by using the color of the object. That is, the configuration data in the run format serves as a type of mask. As the configuration data in the run format, runs sequentially arranged from the left side, each run being constituted by a y coordinate in a main scanning line (coordinate in a sub scanning line) and a pair of x coordinates $(x_l, x_r)$ at the left side and the right side of the run in the main scanning line, are used.

In the run format, items of configuration data in plural main scanning lines adjacent to each other in the direction of a sub scanning line may be integrated into one package. This package is referred to as a "run mask". A run mask is constituted by a pair of coordinates of the vertices on the top left and the bottom right of a rectangle (having sides parallel with the corresponding vertical and horizontal sides of a page), which is an outer configuration of this run mask, and items of run data (items of configuration data in the run format) in individual main scanning lines included in the mask arranged in the sub scanning direction.

The raster mask format is a format expressing the configuration of the object by a binary bitmap of a rectangle. That is, among pixels within a raster mask of a rectangle (having sides parallel with the corresponding vertical and horizontal sides of a page), a set of pixels having a value of 1 represent the configuration of the object. In rendering processing, color values (pixel values) based on the color specification are written into the pixels having a value of 1. Color values are not written into pixels having a value of 0. That is, in rendering processing, no processing is performed on the pixels having a value of 0.

The same resolution and the same color space as those of the printer 50 may be set for the intermediate data. This makes it unnecessary for the rendering section 44 of the back end device 40 to perform conversion of the resolution and the color space. The intermediate data may be separated according to the color plates (for example, CMYK plates), or may be expressed in a composite format into which items of data indicating plural color plates are integrated.

The intermediate data shown in FIG. 3 is only an example. As a result of interpreting PDL data, the interpreter 34 classifies each object represented by the PDL data as a unit configuration (for example, a rectangle format, a run format, or a raster mask format) used in the intermediate data format, and generates data indicating the configuration and the color according to the unit configuration. This data represents an object in the intermediate data format.

The spot color flattening section 36 flattens a spot color component of each of the objects represented by the intermediate data sequentially output from the interpreter 34, and converts the spot color component into basic colors (spot color simulations). When flattening the spot color component, the intermediate data format of this spot color component is maintained. When flattening the spot color component, the spot color flattening section 36 performs processing for converting superposed colors of objects having the same spot color component into a color unique to this spot color component (not into a color resulting from superposing the same spot color component plural times).

Details of processing performed by the spot color flattening section 36 will be discussed later.

The intermediate data output from the spot color flattening section 36 is output to the back end device 40. The intermediate data is then written into the intermediate data buffer 42. The rendering section 44 reads the intermediate data stored in the intermediate data buffer 42 and generates rendering data (raster data) in accordance with the read intermediate data. For example, the spot color flattening section 36 determines the value of each pixel within a range indicated by the configuration data of an object from the color data of this object, and writes the determined pixel values, for example, into addresses of a page memory associated with the pixels of this object, thereby performing rendering of this object. By performing rendering of all objects included in one page, a raster image (rendering data) of this page is generated. The generated rendering data of each page is stored in the output buffer 46, and items of rendering data stored in the output buffer 46 are read by the printer 50. The printer 50 then prints an image corresponding to rendering data of each page on paper.

Figure 4:
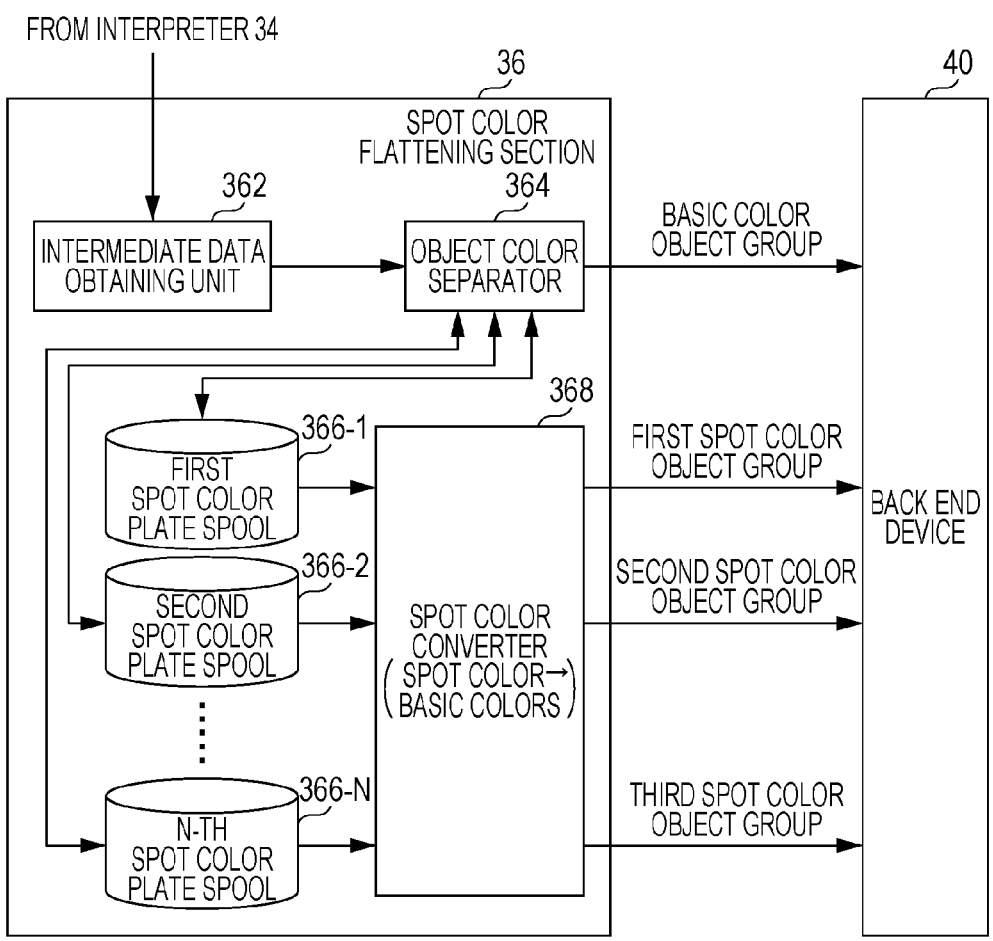
FIG. 4 is a block diagram illustrating an example of the internal configuration of a spot color flattening section.

An example of the internal configuration of the spot color flattening section 36 will be discussed below with reference to FIG. 4. In the example shown in FIG. 4, the spot color flattening section 36 includes an intermediate data obtaining unit 362, an object color separator 364, a first spot color plate spool 366-1 through an N-th spot color plate spool 366-N(N is the total number of spot colors to be used), and a spot color converter 368. The first through N-th spot color plate spools 366-1 through 366-N are provided for spot colors used in print data.

The intermediate data obtaining unit 362 obtains intermediate data representing each object input from the interpreter 34. The intermediate data obtaining unit 362 obtains for each object, for example, a set of bounding box specification, color specification, and configuration specification illustrated in FIG. 3. The interpreter 34 outputs items of intermediate data representing individual objects in accordance with a rendering order of the objects (that is, the order in which rendering of the objects is performed in the rendering section 44), and the intermediate data obtaining unit 362 obtains the items of intermediate data output in this order. Every time the intermediate data obtaining unit 362 obtains an object represented by an item of intermediate data, it supplies the object to the object color separator 364.

The object color separator 364 separates a received object represented by an item of intermediate data into basic color objects constituted by only basic color components and spot color objects constituted by only spot color components. The basic color objects and the spot color objects separated from the object represented by the intermediate data are different from each other only in the color data (see FIG. 3). Other items of data of the basic color objects and those of the spot color objects are the same, that is, they are the same as those of the object represented by the intermediate data. The color data of the basic color objects only indicates values of basic color components (for example, CMYK), while the color data of each spot color object only indicates the name of a corresponding spot color. The object color separator 364 outputs the basic color objects to the back end device 40 (subsequent stage), and stores the spot color objects in the corresponding spot color plate spools among the first through N-th spot color plate spools 366-1 through 366-N (which will be hereinafter collectively referred to as the "spot color plate spool 366" unless it is necessary to distinguish between the individual spot color plate spools 366-1 through 366-N). When storing a spot color object in a corresponding spot color plate spool 366, the object color separator 364 performs eclipse (hiding) processing on a spot color object already stored in the spot color plate spool 366. Details of the eclipse processing will be discussed later.

Each spot color plate spool 366 is a storage region in which intermediate data representing a spot color object having a spot color corresponding to the spot color plate spool 366 output from the object color separator 364 is stored. For example, in the first spot color plate spool 366-1, a spot color object having a first spot color as color data is stored. Each spot color plate spool 366 is secured, for example, in a main memory of the front end device 30.

The spot color converter 368 converts a spot color of a spot color object output from each spot color plate spool 366 into values simulated by using the basic colors. For example, the spot color converter 368 stores therein information indicating the association between the names of first through N-th spot colors and combinations of basic color components if the first-through N-th spot colors are expressed by basic colors and transmission ratios. By referring to this information, the spot color converter 368 replaces the name of a spot color in the color data of each object by the associated basic color component values and the associated transmission ratio.

[Details of Object Color Separator]

Object separation performed by the object color separator 364 will be discussed below in detail with reference to FIGS. 5A and 5B. In the example shown in FIGS. 5A and 5B, green (G) is used as a spot color. FIG. 5A illustrates a case in which an object 102-1 without a spot color (G) component in which a knockout method is specified will be separated. The basic color components of the object 102-1 are (C, M, Y, K)=(1, 0, 0, 0). Since the object 102-1 will be superposed on top of another object by using the knockout method, a spot color (G) component having a value of 0 is considered to be present. In this case, the object color separator 364 separates the object 102-1 into a basic color object 102a-1 having color data of (C, M, Y, K)=(1, 0, 0, 0) and a spot color object 102b-1 having color data of G (0). The basic color object 102a-1 has no spot color (G) component, while the spot color object 102b-1 has no basic color components.

An object having only a spot color (G) component in which the knockout method is specified can be separated in a similar manner. Since this object will be superposed on top of another object by using the knockout method, basic color components (C, M, Y, K)=(0, 0, 0, 0) are considered to be present. In this case, the object is separated into a basic color object having color data of (C, M, Y, K)=(0, 0, 0, 0) and a spot color object having color data of only a spot color.

FIG. 5B illustrates a case in which an object 102-2 having only a spot color (G) component in which an overprint method is specified will be separated. It is assumed that the value of the spot color (G) component of the object 102-2 is 1. In the case of the overprint method, if an object to be superposed on top of another object has no basic color components, the color of the object underneath is transmitted as it is. Thus, basic color components of this object are considered to be absent (NA). In this case, as a result of separating the object 102-2, the object color separator 364 outputs only a spot color object 102b-2 having color data of G=1 (and the transmission ratio corresponding to this spot color). Since none of basic color components are present (NA), a basic color object is not output. Accordingly, even if the object 102-2 is superposed on top of another object, the basic color components of the object under the object 102-2 are maintained, thereby exhibiting the effect of the overprint method.

An object having only basic color components in which the overprint method is specified can be separated in a similar manner. In this case, as a result of separating this object, a basic color object alone is output, and a spot color object is not output.

If one object has N spot colors (for example, two components, such as a green component and an orange component), the object color separator 364 generates N spot color objects for the respective spot color components. The N spot color objects are different from each other only in color data, and the values of the other data elements are the same.

Eclipse processing performed on a spot color object by the object color separator 364 will be discussed below with reference to FIG. 6. Eclipse processing is the following updating processing. When storing a separated spot color object generated by the object color separator 364 in a corresponding spot color plate spool 366, a portion of a spot color object already stored in this spot color plate spool 366 and hidden by this separated spot color object is removed.

As a solar eclipse or a lunar eclipse, "eclipse" means that one object is totally or partially hidden by (blocked) another object. In this eclipse processing, a spot color object separated from an object hides a spot color object which is a previous object in the rendering order and is stored in a corresponding spot color plate spool 366. More specifically, the object color separator 364 performs the following types of eclipse processing: (1) among spot color objects stored in a spot color plate spool 366, a spot color object totally hidden by a separated spot color object (that is, the entirety of a spot color object is contained within a separated spot color object) is deleted from the spot color plate spool 366; (2) among spot color objects stored in a spot color plate spool 366, the configuration of a spot color object partially overlapping a separated spot color object is changed to a configuration from which an overlapping portion is removed; and (3) among spot color objects stored in a spot color plate spool 366, no change is made to a spot color object that does not overlap a separated spot color object at all.

In eclipse processing, concerning a spot color object hidden by a separated spot color object, only the configuration of this spot color object is changed, and basically, color data of this spot color object is not changed.

In the above-described type (2) of eclipse processing, that is, in processing for changing the configuration of a spot color object partially overlapping a separated spot color object to a configuration from which an overlapping portion is removed, if the intermediate data format is a format by which a complicated object configuration can be expressed, the configuration data of a spot color object stored in a spot color plate spool 366 is simply changed to configuration data indicating a modified configuration of the spot color object.

If the configuration of an object that can be expressed by the intermediate data format is restricted, in eclipse processing, a spot color object may be divided into plural objects that can be expressed by the intermediate data format, and then, the spot color object may be expressed by combining the divided objects.

If the configuration format of an object is restricted to a rectangle format, a run format, and a raster mask format, in eclipse processing, the configurations of spot color objects stored in a spot color plate spool 366 which are partially hidden by a separated spot color object are all expressed by a run format.

If spot color objects overlapping each other are both expressed in the run format, the following eclipse processing is performed. If a first run $(x_{j1}, x_{r1})$ disposed within a spot color object (on the bottom side in the overlapping order) stored in a spot color plate spool 366 overlaps a second run $(x_{j2}, x_{r2})$ disposed within a separated spot color object (on the top side in the overlapping order) having the same y coordinate as that of the first run, the first run $(x_{j1}, x_{r1})$ of the spot color object is changed to a run $(x_{j1}, x_{x/2})$ (if the right side of the first run is hidden), or is changed to a run $(x_{r2}, x_{r1})$ (if the left side of the first run is hidden). If the entirety of the first run $(x_{j1}, x_{r1})$ is contained within the second run $(x_{j2}, x_{r2})$, data indicating the first run $(x_{j1}, x_{r1})$ is deleted from the configuration data of the spot color object stored in the spot color plate spool 366.

As is seen from the definition of the above-described rectangle format and raster mask format, they may be expressed by the run format (or the run mask format). Accordingly, if the configuration of a spot color object stored in a spot color plate spool 366 is modified by performing eclipse processing, the configuration data of the spot color object is first converted into a run format, and then, the modified configuration is calculated.

Since eclipse processing is processing concerning object configurations, basically, it is not necessary to change color data of objects, particularly, processing for calculating the colors of individual pixels within an object is not necessary. For example, in the case of color data of a raster mask format, since a position coordinate system used in the printer 50 is different from that of the color data, in order to find colors of individual pixels corresponding to those in the printer 50 from color data, geometric coordinate transformation, such as translation, rotation, and enlargement and reduction, is necessary. The rendering section 44 determines the colors of individual pixels by performing such processing. On the other hand, however, in eclipse processing, the spot color flattening section 36 does not have to determine the colors of individual pixels.

A description will now be given, with reference to FIG. 6, of a specific example of processing (including eclipse processing) performed by the object color separator 364 for storing a separated spot color object in a corresponding spot color plate spool 366. In the upper section of FIG. 6, four spot color objects 102b (intermediate data) having the same spot color (green (G) in the example shown in FIG. 6) which are disposed within a page 100 and which are sequentially generated as a result of separating an object by the object color separator 364 are shown, together with numbers 1 through 4 indicating the generating order. In the lower section of FIG. 6, the states of an object group stored in the spot color plate spool 366 when the four spot color objects 102b shown in the upper section are stored in the spot color plate spool 366 are shown. The outline of the page 100 is indicated as a reference for representing the position of each of the spot color objects 102b in the page 100.

The first spot color object 102b is a spot color object having the value of G=0. As discussed above, a spot color object having a spot color component value of 0 is generated from an object in which the knockout method is specified. At this time point, no spot color objects are stored in the G spot color plate spool 366, and thus, eclipse processing is not performed. A spot color object having a spot color component value of 0 is used for exhibiting the knockout effect by executing eclipse processing on a previous spot color object in the rendering order. Accordingly, rendering of this spot color object is not necessary. Thus, the first spot color object 102b is not stored in the G spot color plate spool 366. The second spot color object 102b has color data having the value of G=1. At this time point, too, no spot color objects are stored in the G spot color plate spool 366, and thus, eclipse processing is not performed. The second spot color object 102b is stored in the G spot color plate spool 366 and serves as the first spot color object 102b in the G spot color plate spool 366. The third spot color object 102b partially overlaps the first spot color object 102b (which is the second spot color object 102b in the input order) in the G spot color plate spool 366. Accordingly, the configuration of the first spot color object 102b stored in the G spot color plate spool 366 is changed to a configuration from which a portion overlapping the third spot color object 102b is removed. The third spot color object 102b is stored in the G spot color plate spool 366 and serves as the second spot color object 102b in the G spot color plate spool 366. The fourth spot color object 102b has color data having the value of G=0. The fourth spot color object 102b includes the entirety of the second spot color object 102b (which is the third spot color object 102b in the input order), and partially overlaps the first spot color object 102b (which is the second spot color object 102b in the input order). Although the value of the spot color component of the fourth spot color object 102b is 0, the fourth spot color object 102b is present as an object. Accordingly, upon the input of the fourth spot color object 102b, the configuration of the first spot color object 102b in the G spot color plate spool 366 is changed to a configuration from which a portion overlapping the fourth spot color object 102b is removed, and the second spot color object 102b totally hidden by the fourth spot color object 102b is deleted. In this case, all data items of the second spot color object 102b including the color data and other attribute data stored in the G spot color plate spool 366 are deleted from the G spot color plate spool 366. Thus, the second spot color object 102b no longer exists. Since the fourth spot color object 102b is used for exhibiting the knockout effect, it is not stored in the G spot color plate spool 366. If the fourth spot color object 102b is the final object in the rendering order in the page 100, at the time point at which the above-described processing has finished for the fourth spot color object 102b, the object (in this example, only the first spot color object 102b with a modified configuration) stored in the G spot color plate spool 366 is output to the back end device 40.

[Procedure of Exemplary Embodiment]

An example of a procedure of processing executed by the spot color flattening section 36 will now be described below with reference to FIGS. 7A and 7B. In this procedure, in step S10, the intermediate data obtaining unit 362 of the spot color flattening section 36 obtains a new object output from the interpreter 34, and then supplies the obtained object to the object color converter 364.

This object will be referred to as a "current object". Then, in step S12, the object color converter 364 determines whether or not the current object is an object to be subjected to rendering in a spot color plate. This determination may be made according to whether or not the current object includes a spot color component represented by color data and according to whether or not the overprint method is specified in the current object. If the overprint method is not specified in the current object, it means that the current object will be superposed on top of another object by using the knockout method. In this case, the object color converter 364 determines in step S12 that the current object is an object to be subjected to rendering in a spot color plate (the result of step S12 is YES), regardless of whether or not the current object includes a spot color component. If the overprint method is specified and if the current object includes at least one spot color component having a positive value, the object color converter 364 determines in step S12 that the current object is an object to be subjected to rendering in a spot color plate.

If the overprint method is specified and if the current object does not include even one spot color component, the object color converter 364 determines in step S12 that the current object is not an object to be subjected to rendering in a spot color plate (the result of step S12 is NO).

If the result of step S12 is NO, the process proceeds to step S14. In step S14, the object color separator 364 outputs the current object to the back end device 40.

If the result of step S12 is YES, the process proceeds to step S16. In step S16, the object color separator 364 separates the current object into a basic color object and a spot color object corresponding to each spot color plate. If the overprint method is specified in the current object, in step S16, the object color separator 364 generates the same number of spot color objects as that of spot colors included in the current object. If the overprint method is specified in the current object and if the current object does not include any basic color component, a basic color object is not generated in step S16. If the overprint method is not specified in the current object (that is, if the knockout method is specified), in step S16, the object color separator 364 generates a spot color object of each of spot colors used in print data, regardless of whether or not the current object includes a spot color. In this case, a spot color object of a spot color that is not included in the current object includes color data indicating that the value of this spot color is 0. If the knockout method is specified in the current object and if the current object does not include any basic color, the object color separator 364 generates a basic color object having color data indicating that the values of basic color components are 0.

After separating the current object in step S16, in step S18, the object color separator 364 outputs the basic color object separated from the current object to the back end device 40. If a basic color object is not generated as a result of separating the current object, in step S18, no basic color object is output.

Then, the object color separator 364 executes steps S20 and S22 for each spot color object generated as a result of separating the current object.

In step S20, the object color separator 364 performs eclipse processing for all objects stored in the spot color plate spool 366 corresponding to a certain spot color object. Then, in step S22, the object color separator 364 stores this spot color object in the spot color plate spool 366. If the value of color data of the spot color object is 0, it means that this spot color object will be used for exhibiting the knockout effect, and thus, it is not stored in the spot color plate spool 366.

If processing in steps S20 and S22 has been completed for all the spot color objects separated from the current object, the object color separator 364 proceeds to step S24 to determine whether or not there is an object to be processed. If the result of step S24 is YES, the process returns to step S10 in which a subsequent item of intermediate data is obtained. Then, steps S12 through S24 are repeated. A determination of step S24 may be made according to the unit range (page, band, or tile) of an image to be printed by the printer 50. A band is one of plural band-like regions obtained by dividing a page along lines of the main scanning direction perpendicular to the sub scanning direction (feeding direction of paper when printing is performed). A tile is one of rectangular regions obtained by dividing a page both in the main scanning direction and the sub scanning direction. In step S24, for example, the object color separator 364 determines whether or not data indicating the tail of a unit range (such as a page) output from the interpreter 34 has arrived. If the data has arrived, the object color separator 364 determines in step S24 that processing for all objects in this unit range has finished (that is, the result of step S24 is NO). The procedure in FIGS. 7A and 7B is repeated for each unit range.

If the result of step S24 is NO, the process proceeds to step S26. In step S26, the spot color flattening section 36 determines whether or not processing for steps S28 through S38 has finished for all spot colors appearing in one unit range. If the result of step S26 is NO, the process proceeds to step S28. In step S28, among spot colors that have not been processed, a spot color that is superposed first in the color plates is selected. Then, in step S30, it is determined whether or not an object that has not been output is stored in the spot color plate spool 366 corresponding to the selected spot color. If the result of step S30 is YES, the process proceeds to step S32. In step S32, the object that has not been output and that will be output first (that is, the object that has been stored first in the spot color plate spool 366) is extracted. Then, in step S34, the value of the transmission ratio corresponding to the name of a spot color represented by the color data of the extracted object is determined, and a command, which is in the intermediate data format, to set the transmission ratio of the object to this value is output to the back end device 40. Then, in step S36, the spot color converter 368 of the spot color flattening section 36 converts the name of the spot color represented by the color data of this object into that of basic colors, and replaces the values of the color data of this object by those of the basic colors. Then, the spot color converter 368 outputs the replaced object to the back end device 40. Then, in step S38, the spot color flattening section 36 outputs a command, which is in the intermediate data format, to cancel (reset) the transmission ratio set in step S34 to the back end device 40.

Steps S32 through S38 are repeated until all objects in the spot color plate spool 366 corresponding to the spot color selected in step S28 are output (until the result of step S30 is NO). Then, if it is determined in step S30 that all the objects in the spot color plate spool 366 are output, the process returns to step S26. Then, if it is determined in step S26 that steps S28 through S38 have been completed for all the spot colors, processing executed by the spot color flattening section 36 for the unit range has been completed.

For the sake of convenience, a description has been given such that the objects stored in the spot color plate spool 366 are output in the order in which the objects have been stored in the spot color plate spool 366. However, this is not compulsory. Each object stored in a spot color plate spool 366 has already been modified into a configuration from which a portion hidden by an object to be subsequently output is removed, and thus, there is no portion of an object overlapping another object. Accordingly, objects stored in a spot color plate spool 366 may be output in any order.

Additionally, in the above-described example, setting and canceling of the transmission ratio is performed in steps S34 and S38 for each object in a spot color plate spool 366. However, if the transmission ratio of all the objects in a spot color plate spool 366 is the same, the transmission ratio may be set before extracting the first object from the spot color plate spool 366 and may be canceled after extracting the final object from the spot color plate spool 366. This technique may be applicable if the transmission ratio is determined from the name of a spot color (that is, if a spot color itself has a unique transmission ratio). On the other hand, if the transmission ratio is specified for each object independently of the name of a spot color, the transmission ratio is set and canceled for each object, as shown in FIG. 7B.

A specific example of the procedure shown in FIGS. 7A and 7B will be described below in detail with reference to FIG. 8.

Figure 8:
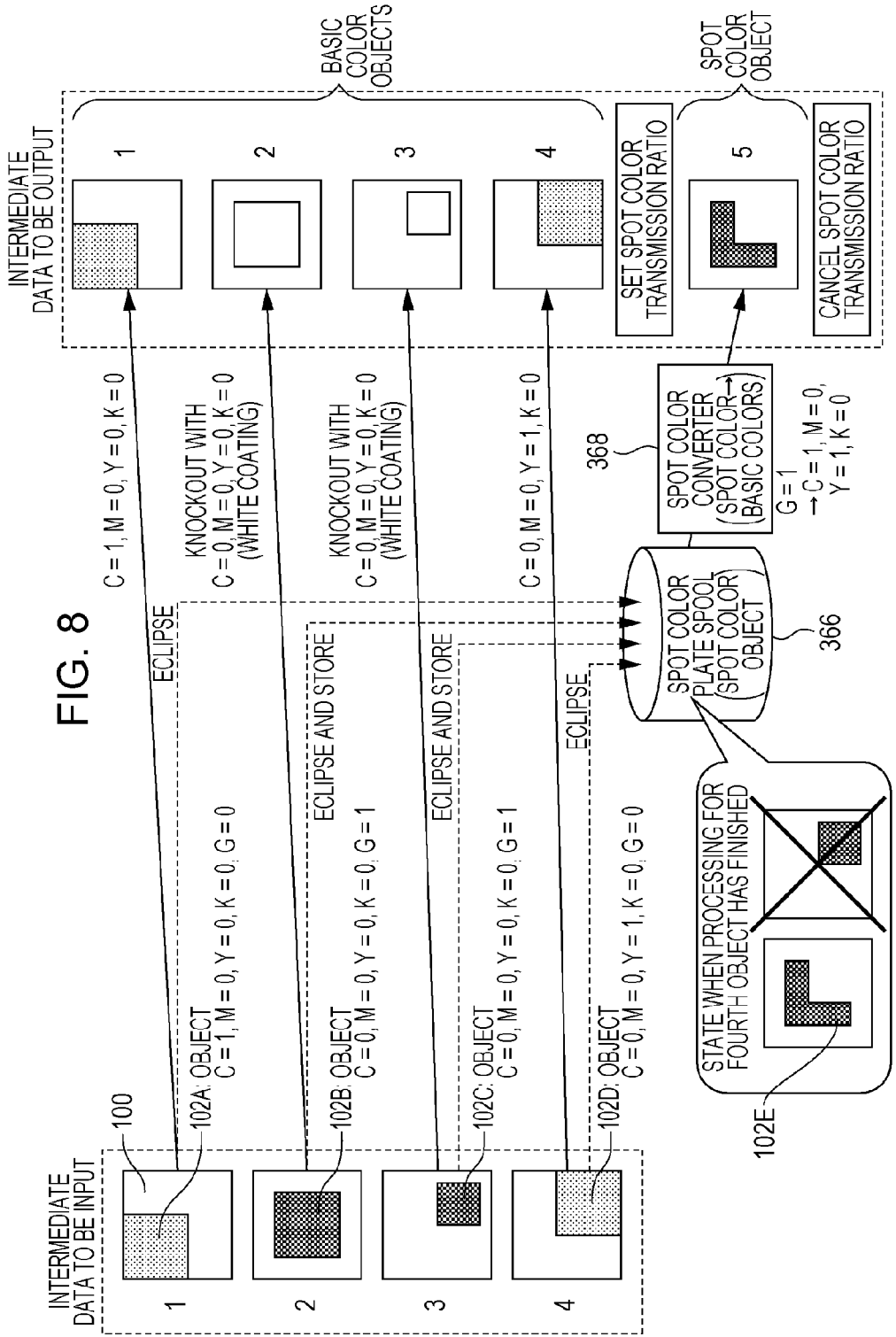
FIG. 8 illustrates a specific example of spot color flattening processing (with a knockout method)

In this example, four objects 102A through 102D shown on the left side of FIG. 8 are input into the spot color flattening section 36 in this order, and the knockout method is specified in all the objects 102A through 102D. A spot color used in this example is only green (G). The color of the object 102A is represented by (C, M, Y, K, G)=(1, 0, 0, 0, 0). The colors of the objects 102B and 102C are represented by (C, M, Y, K, G)=(0, 0, 0, 0, 1). The color of the object 102D is represented by (C, M, Y, K, G)=(0, 0, 1, 0, 0).

Figure 7A:
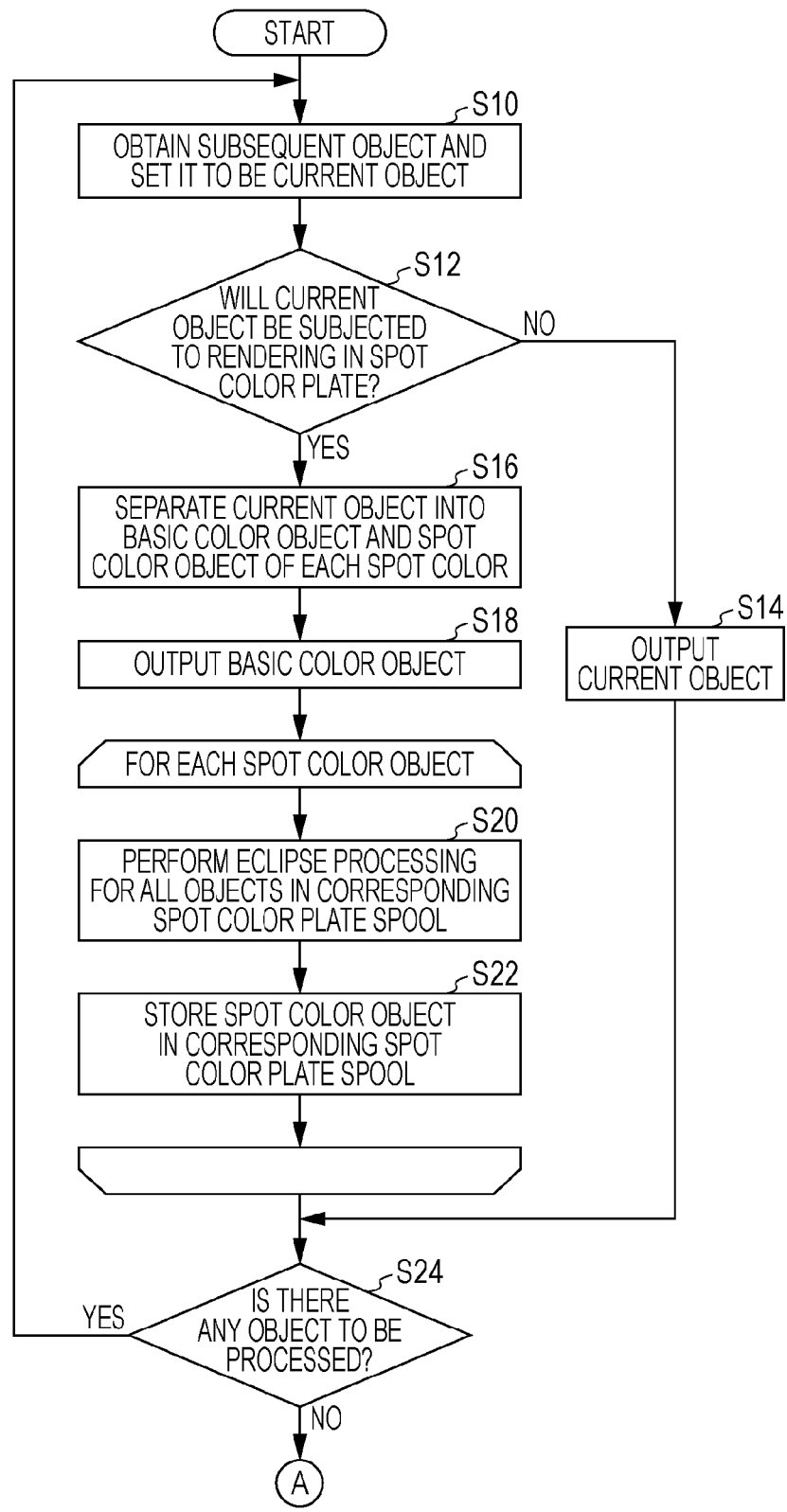

According to the procedure shown in FIGS. 7A and 7B, the first object 102A is separated into a basic color object having a basic color of (C, M, Y, K)=(1, 0, 0, 0) and a spot color object having a spot color of G=0. The basic color object is output to the back end device 40, and is shown as the first basic color object within a rectangular area indicated by the broken lines (intermediate data to be output) on the right side of FIG. 8. On the other hand, the spot color object having a spot color of G=0 is used for performing eclipse processing on an object in the G spot color plate spool 366. However, it is not stored in the G spot color plate spool 366 since the value of the spot color is 0.

Then, the second object 102B is separated into a basic color object having no basic color of (C, M, Y, K)=(0, 0, 0, 0) and a spot color object having a spot color of G=1. The basic color object is output to the back end device 40, and is shown as the second basic color object within the rectangular area indicated by the broken lines (intermediate data to be output). This means that a white coating is applied onto another object by the configuration of this basic color object. On the other hand, the spot color object having a spot color of G=1 is stored in the G spot color plate spool 366.

Then, the third object 102C is separated into a basic color object having a basic color of (C, M, Y, K)=(0, 0, 0, 0) and a spot color object having a spot color of G=1. The basic color object is output to the back end device 40, and is shown as the third basic color object within the rectangular area indicated by the broken lines (intermediate data to be output). This also means that as in the second object 102B, a white coating is applied onto another object by the configuration of this basic color object. On the other hand, the spot color object having a spot color of G=1 is used for performing eclipse processing on an object in the G spot color plate spool 366, and is then stored in the G spot color plate spool 366.

Then, the fourth object 102D is separated into a basic color object having a basic color of (C, M, Y, K)=(0, 0, 1, 0) and a spot color object having a spot color of G=0. The basic color object is output to the back end device 40, and is shown as the fourth basic color object within the rectangular area indicated by the broken lines (intermediate data to be output). On the other hand, the spot color object having a spot color of G=0 is used for performing eclipse processing on an object in the G spot color plate spool 366. However, it is not stored in the G spot color plate spool 366 since the value of the spot color is 0.

The transition of the content in the spot color plate spool 366 is similar to that shown in FIG. 6.

At the time point at which the above-described processing has finished, a spot color object 102E is stored alone in the G spot color plate spool 366. When processing for the fourth object 102D has finished, and more specifically, when output of the basic color object and processing concerning the spot color plate spool 366 has finished, the spot color object 102E stored in the spot color plate spool 366 is output to the back end device 40. When outputting the spot color object 102E, a command to set the transmission ratio of the spot color object 102E is output, and then, color data of the spot color object 102E is replaced by that of basic color components by the spot color converter 368, and then, the converted spot color object is output. Thereafter, a command to cancel the previously set transmission ratio is output.

In the example shown in FIG. 8, processing performed in a case in which the knockout method is specified in an object group has been discussed. A description will now be given, with reference to FIG. 9, of a specific example of processing to be performed in a case in which an object group in which the overprint method is specified is input.

Figure 9:
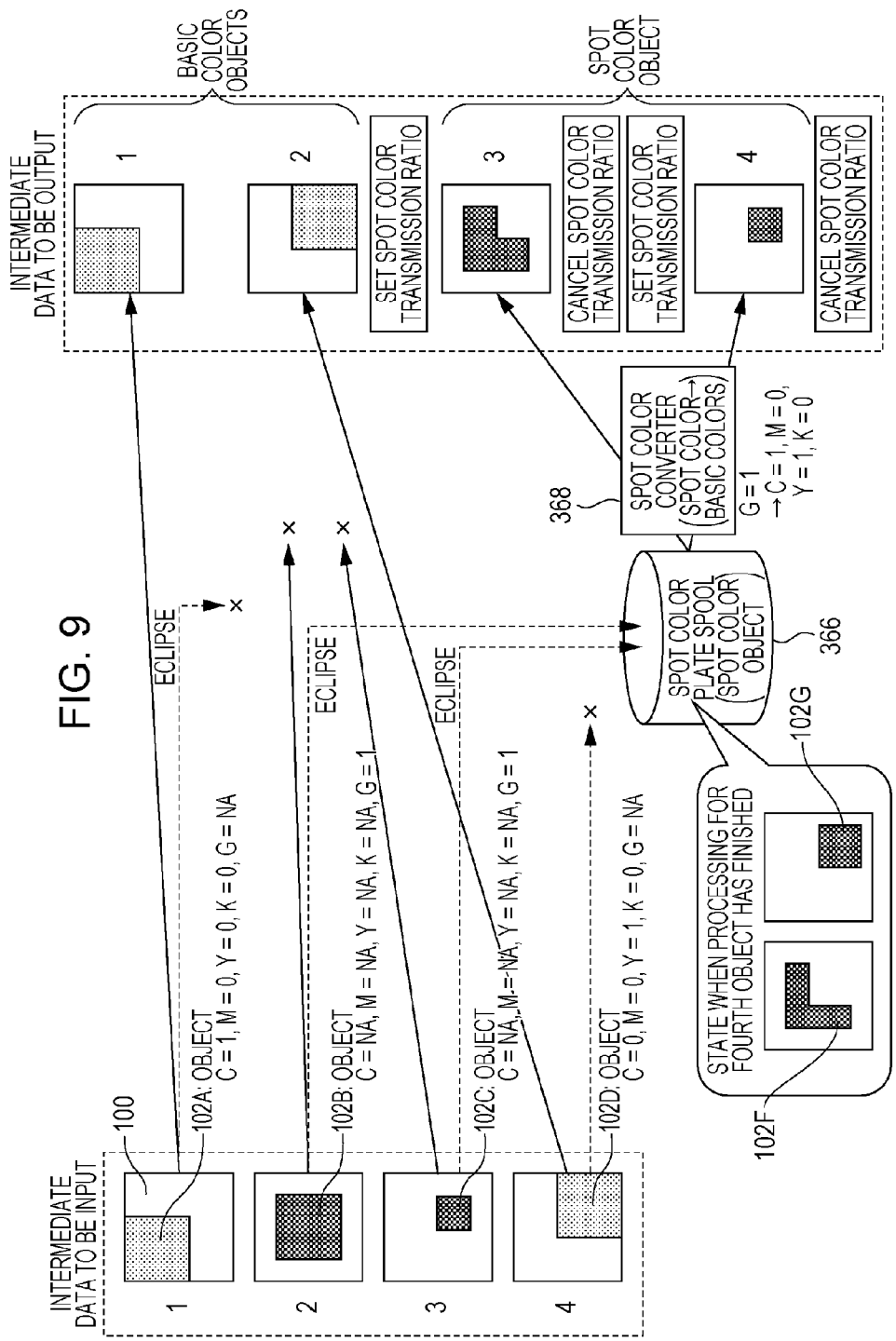
FIG. 9 illustrates a specific example of spot color flattening processing (with an overprint method)

Four objects 102A through 102D shown on the left side of FIG. 9 are sequentially input into the spot color flattening section 36 in this order. These four objects 102A through 102D are the same as those shown in FIG. 8, except that the overprint method is specified in the objects 102A through 102D shown in FIG. 9. In the case of the overprint method, the value of a color plate without a color component is set to be NA (not present). Accordingly, the color of the object 102A is represented by (C, M, Y, K, G)=(1, 0, 0, 0, NA). The colors of the objects 102B and 102C are represented by (C, M, Y, K, G)=(NA, NA, NA, NA, 1). The color of the object 102D is represented by (C, M, Y, K, G)=(0, 0, 1, 0, NA).

Concerning the color separation of the first object 102A, a basic color object having a basic color of (C, M, Y, K)=(1, 0, 0, 0) is generated, while a G spot color object is not generated since the value of the G spot color is NA. The generated basic color object is output to the back end device 40, and is shown as the first basic color object within a rectangular area indicated by the broken lines (intermediate data to be output) on the right side of FIG. 9. Since a spot color object is not generated, eclipse processing is not performed on an object in the spot color plate spool 366.

Concerning the color separation of the second object 102B, a spot color object having a spot color of G=1 is generated, while a basic color object is not generated. Accordingly, a basic color object is not output, and the spot color object is stored in the spot color plate spool 366.

Concerning the color separation of the third object 102C, as well as that of the second object 102B, a spot color object having a spot color of G=1 is generated, while a basic color object is not generated. The spot color object is used for performing eclipse processing on an object in the G spot color plate spool 366 (at this time point, the spot color plate object corresponding to the second object 102B), and is then stored in the spot color plate spool 366.

Then, concerning the color separation of the fourth object 102D, a basic color object having a basic color of (C, M, Y, K)=(0, 0, 1, 0) is generated, while a G spot color object is not generated since the value of the G spot color is NA. The generated basic color object is output to the back end device 40, and is shown as the second basic color object within the rectangular area indicated by the broken lines (intermediate data to be output) in FIG. 9. Since a spot color object is not generated, eclipse processing is not performed.

At the time point at which the above-described processing has finished, a spot color object 102F originated from the second object 102B and a spot color object 102G originated from the third object 102C are stored in the G spot color plate spool 366. Upon completing the output of the basic color object of the fourth object 102D, the spot color objects 102F and 102G stored in the spot color plate spool 366 are output to the back end device 40. When outputting the spot color objects 102F and 102G, a command to set the transmission ratio of each of the spot color objects 102F and 102G is output, and then, color data of each of the spot color objects 102F and 102G is replaced by that of basic color components by the spot color converter 368. Then, the converted spot color objects are output. Thereafter, a command to cancel the previously set transmission ratios is output.

[Summary of Exemplary Embodiment]

An exemplary embodiment of the present invention has been discussed above. In this exemplary embodiment, since each object stored in a spot color plate spool 366 has been modified into a configuration from which a portion hidden by an object having the same spot color to be subsequently output is removed, and thus, there is no portion of an object overlapping another object. Accordingly, when a spot color of each of the objects (intermediate data format) stored in the spot color plate spool 366 is converted into basic colors, and then, the converted objects are rasterized by the back end device 40, these objects do not overlap each other at all. Thus, a color resulting from superposing the same spot color plural times is not generated.

This exemplary embodiment also deals with the issue concerning color reproduction of an overlapping portion of different spot colors.

Generally, a spot color (converted into basic colors) of an object is superposed on top of a color of another object in the order in which objects are generated. In this technique, as stated above, a correct color is not reproduced as a result of printing at a portion in which the same spot color is superposed plural times. Additionally, there may be a case in which a correct color is not reproduced at a portion in which different spot colors are superposed on each other. The reason for this is that the appearing order of objects of individual spot colors in print data does not necessarily coincide with the superposing order of spot color plates. For example, even if a spot color (orange) object is superposed on a spot color (green) object when printing is performed, there may be a case in which a spot color (green) object is superposed on a spot color (orange) object in print data, since the superposing order of objects in document data to be printed is at the discretion of a document creator. In this manner, if the superposing order of objects in print data is different from that of spot color plates, the application order of transmission ratios unique to the spot colors in print data is different from that of spot color plates. Accordingly, if a spot color of an object is simulated by using basic colors and this object is superposed on top of another object by using this transmission ratio in print data, the resulting color may turn out to be different from that obtained when objects are superposed on each other in the superposing order of spot color plates.

In contrast, in the above-described exemplary embodiment, plural different spot color components appearing within one unit range, such as a page, are accumulated in associated spot color plate spools 366 (as plural objects that do not overlap each other in each spot color plate spool 366). Then, the objects in the spot color plate spools 366 are output in accordance with the superposing order of spot color plates used in printing. According to this procedure, the spot color components within the unit range are output, not in the order of objects in print data, but in the order of spot color plates. As a result, the same color as that when objects are superposed in the order of spot color plates in a printing operation is reproduced.

[First Modified Example]

A first modified example will be discussed below. The system configuration of the first modified example is the same as that of the above-described exemplary embodiment (see FIG. 1). A spot color flattening section 36a of the first modified example is different from the spot color flattening section 36 of the exemplary embodiment. The configuration of the spot color flattening section 36a is shown in FIG. 10.

Figure 10:
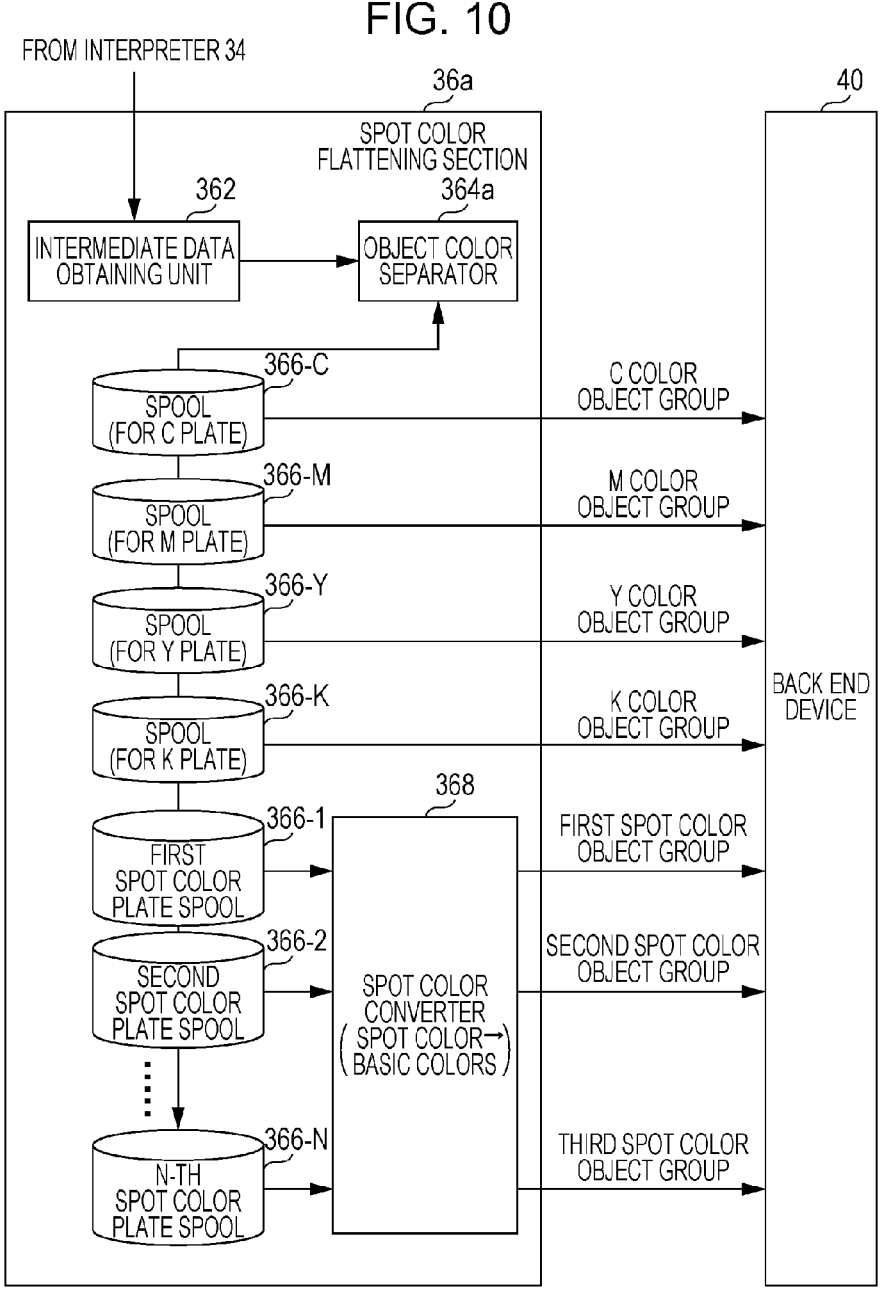
FIG. 10 is a block diagram illustrating an example of the internal configuration of a spot color flattening section in a first modified example.

In the example shown in FIG. 10, the spot color flattening section 36a includes, not only spot color plate spools 366-1 through 366-N for spot colors, but also basic color plate spools 366-C, 366-M, 366-Y, and 366-K for basic color components (C, M, Y, and K). Items of color data of objects output from the spot color plate spools 366-1 through 366-N are converted into color data of basic color components by the spot color converter 368. However, objects output from the basic color plate spools 366-C, 366-M, 366-Y, and 366-K are not subjected to such conversion processing. Due to the provision of the basic color plate spools 366-C, 366-M, 366-Y, and 366-K, part of the content of processing performed by an object color separator 364a is different from that by the object color separator 364 of the exemplary embodiment (see FIGS. 7A and 7B).

Figure 11:
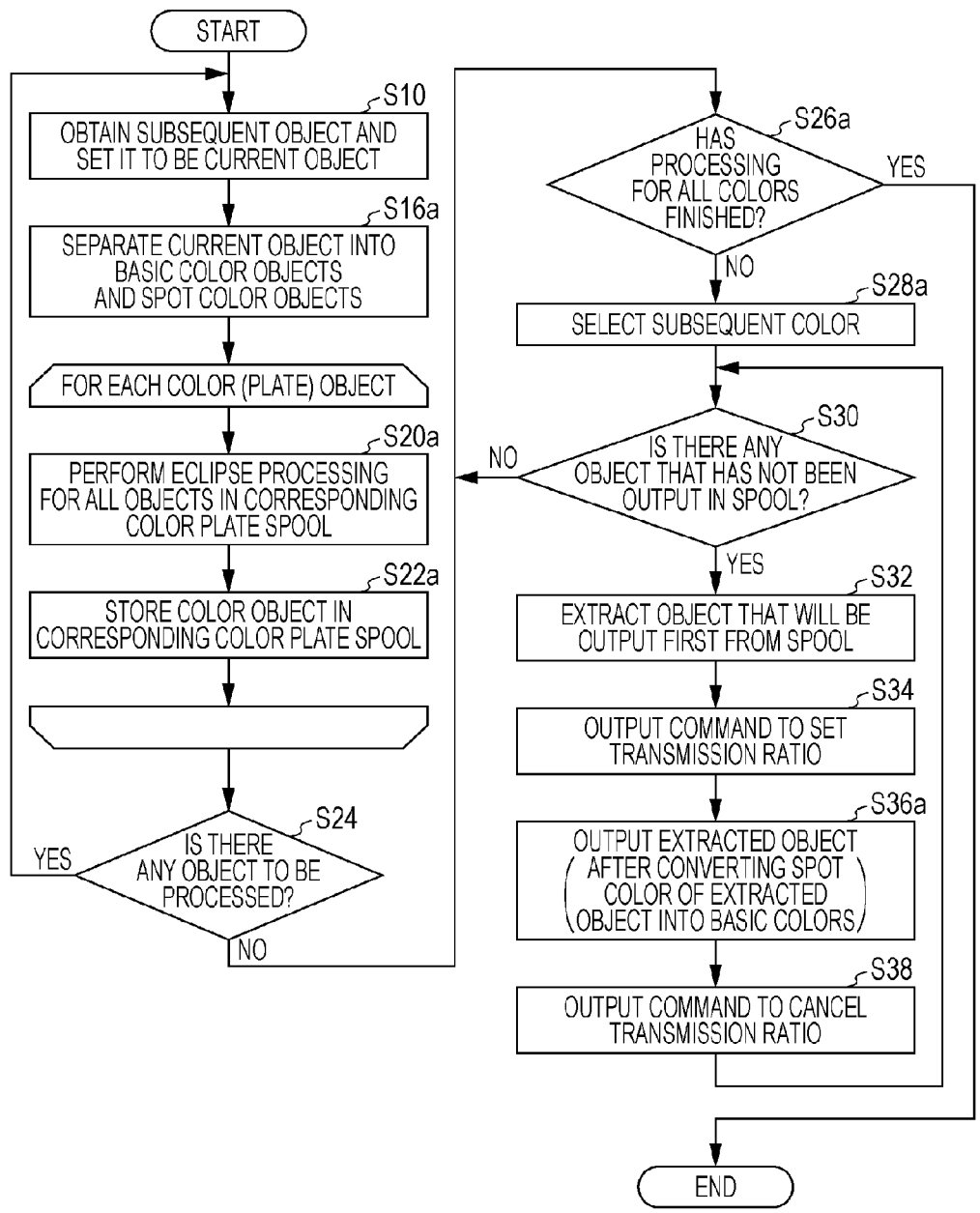
FIG. 11 is a flowchart illustrating an example of a procedure of processing performed by the spot color flattening section in the first modified example.

FIG. 11 is a flowchart illustrating a procedure of processing executed by the spot color flattening section 36a of the first modified example. In FIG. 11, steps similar to those shown in FIGS. 7A and 7B are designated by like step numbers.

In the procedure shown in FIG. 11, after the intermediate data obtaining unit 362 obtains a new object (current object) in step S10, the process proceeds to step S16a. In step S16a, the object color separator 364a separates this current object into objects of individual basic color plates and objects of individual spot color plates. In this color separation processing, objects are generated only for color plates of existing color components. For example, if the knockout method is specified in the current object, objects are generated for color plates of all the basic colors and spot colors. In contrast, if the overprint method is specified in the current object, objects are not generated for color plates of color components that are not present (NA), and objects are generated only for color plates of color components that are present. Color data of an object of each color plate generated in the color separation processing in step S16a indicates the value of a color component of a corresponding color plate (that is, the values of color components of the other color plates are NA).

Then, in step S20a, by using each of the objects of each color plate generated in color separation processing in step S16a, the object color separator 364a performs eclipse processing on each object stored in a corresponding plate spool 366. Then, in step S22a, the generated object is stored in the corresponding plate spool 366. However, if the value of the color component of this object is 0, the object is not stored in the plate spool 366. Steps S10 through S22a are repeated for all objects contained in a unit range, such as a page, and it is determined in step S24 whether or not processing for all objects in this unit range has finished.

If the result of step S24 is NO, the spot color flattening section 36a determines in step S26a whether or not processing for steps S28a through S38 has finished for all the colors appearing in one unit range. If the result of step S26a is NO, the process proceeds to step S28a. In step S28a, among color plates that have not been processed, a color plate that is superposed first is selected. Steps S30 through S38 are similar to those shown in FIG. 7B, and the object of the color plate selected in step S28a stored in the spool 366 is output to the back end device 40. However, in step S36a, color data of an object of a basic color plate does not have to be converted into that of basic color components.

In the first modified example, objects of all color plates are accumulated in associated plate spools 366 and eclipse processing is performed. Then, when all objects within a unit range (such as a page) have been accumulated, the objects in the respective plate spools 366 are output to the back end device 40 in the superposing order of objects when a printing operation is performed. In the above-described exemplary embodiment, basic color objects obtained by color separation processing performed by the object color separator 364 are immediately output to the back end device 40. Accordingly, a determination is made only as to the superposing order of spot color objects on basic color objects. In contrast, in the first modified example, the superposing order of individual basic color objects and individual spot color objects may be made as desired.

In the first modified example, a basic color plate spool 366 is provided for each basic color. In an alternative mode, one basic color plate spool 366 may be provided for all the basic colors. In this case, basic color objects (including four C, M, Y, K color components) that are output to the back end device 40 in the example shown in FIG. 8 are sequentially stored in this basic color plate spool 366. Then, a new basic color object eclipses another basic color object that has already been stored in the basic color plate spool 366, and this new basic color object is also stored in the basic color plate spool 366. In this mode, the superposing order of basic colors and spot colors may be reversed from that shown in FIG. 8.

[Second Modified Example]

A second modified example will be discussed below with reference to FIGS. 12 through 14. In the system configuration shown in FIG. 12, the front end device 30 includes two interpreters 34, that is, a logical page interpreter 34-p and a cache element interpreter 34-c.

The cache element interpreter 34-c is a dedicated interpreter that interprets elements to be cached (cache element) included in PDL data. The cache element interpreter 34-c also converts PDL data of cache elements into an intermediate data format. A cache element is an image element (object) which is repeatedly used plural times in one item of PDL data. For example, in the case of PostScript (registered), an object type, such as a form or an image, is an example of a cache element. A cache element is constituted by one or more objects. A determination as to whether or not an image element is a cache element may be made from an element type. For example, if a rendering command corresponding to a type of element to be cached, such as, a form or an image, is found from PDL data, one or more objects to be subjected to rendering by this rendering command are determined to be a cache element. In PDL data, usually, identification information for uniquely identifying an object to be cached in the PDL data is appended to such an object. If commands that specify the same object ID are found in PDL data, they indicate an instruction to perform rendering on the same object.

Figure 12:
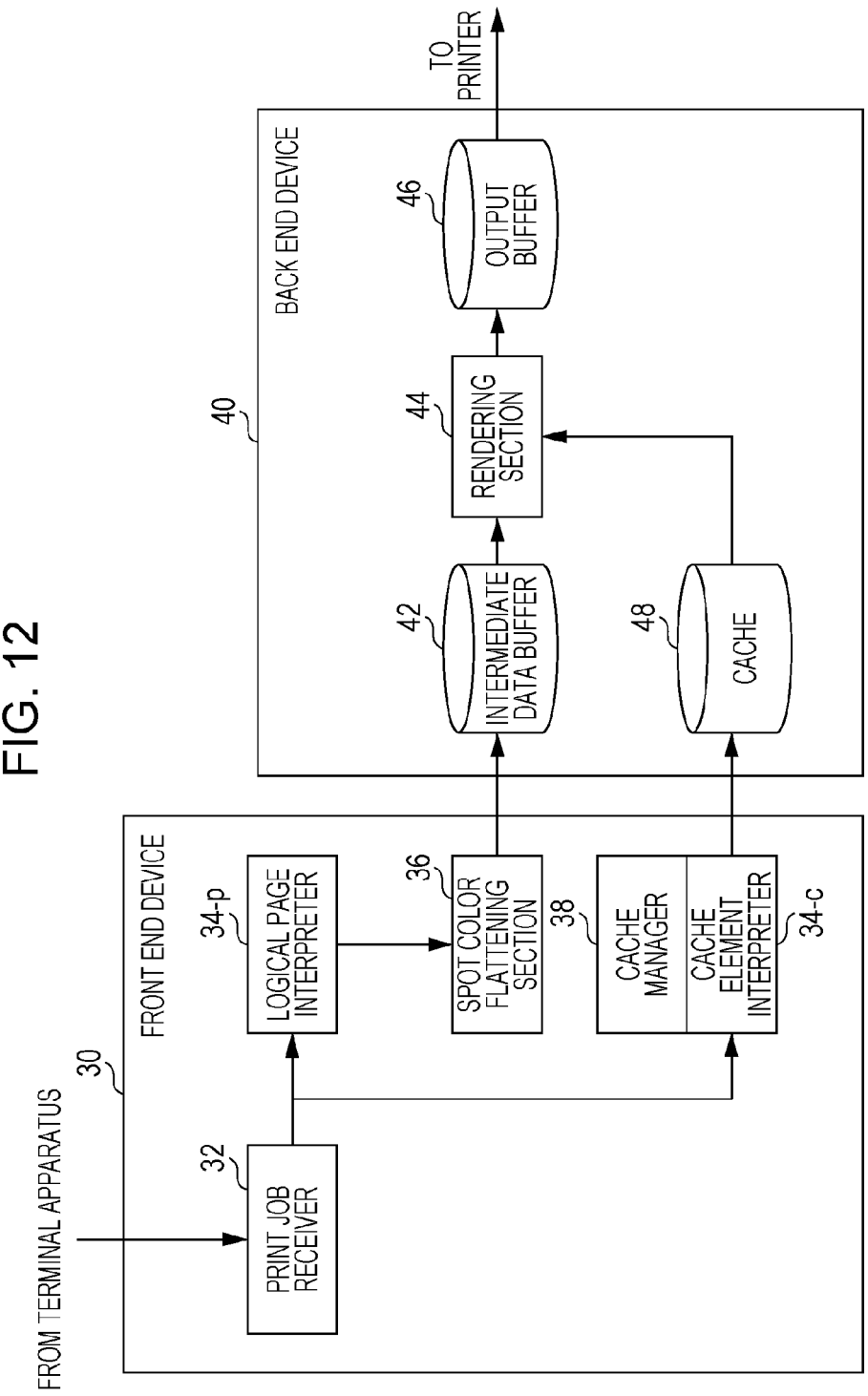
FIG. 12 is a block diagram illustrating an example of the functional configuration of a front end device and that of a back end device in a second modified example.

In the second modified example, a cache 48 is disposed in the back end device 40, as shown in FIG. 12. Every time a cache element is generated, the cache 48 caches intermediate data of such a cache element and reuses it when necessary. This makes it possible to avoid an inefficient operation for generating intermediate data of the same cache element many times. The cache 48 is a storage region in which intermediate data of a cache element is temporarily stored.

While sequentially interpreting elements of PDL data from a head element, the cache element interpreter 34-*c* generates intermediate data only for cache elements, and converts a description of the cache elements into intermediate data. Then, the cache element interpreter 34-*c* associates the intermediate data of a cache element with a cache ID for uniquely identifying this cache element, and stores the cache element in the cache 48 of the back end device 40.

As an example of the cache ID, the object ID of this cache element in the PDL data may be used.

As another example of the cache ID, a cache ID may be generated on the basis of various rendering parameters that define the state of an image obtained by performing rendering of the cache element. Examples of the rendering parameters that define the cache ID are a rendering command (or an object ID), a coordinate transformation matrix (matrix representing the angle of rotation or the enlargement/reduction ratio of coordinates), rendering attribute information (such as a line width, a line cap, a line join, a miter limit, a line configuration, stroke adjustment, a rendering method, a logical operation mode, and pattern information), clip information, and color information. For example, data obtained by coupling these parameters with each other is expressed as binary data, and then, a cache ID is generated from this binary data by using a hash function, such as an MD5 hash function (defined by, for example, rfc1321). The above-described parameter group used as materials for generating a cache ID is referred to as "key data". Strictly speaking, there is a collision between hash functions, and thus, by the above-described generating method, the same cache ID (hash value) may be generated for different elements of cache data. In order to avoid a collision between hash values, key data itself may be used as a cache ID. However, since key data is a relatively long item of data, when checking for an available element of cache data, it takes a considerably long time to verify items of key data against each other. It takes a considerably long time to verify items of key data against each other for all cache entries in a cache manager 38. Accordingly, in the following example, a combination of key data and a hash value for this key data is used as a cache ID. In this example, when checking for an available element of cache data, cache entries are narrowed down first by using a hash value so as to reduce the number of cache entries for which items of key data will be checked against each other.

The cache manager 38 stores management information concerning cache data (that is, intermediate data of cache elements) to be stored in the cache 48. In the cache manager 38, for each element of cache data, a cache ID of an element of cache data and information indicating a storage location of this element of cache data in a storage space of the cache 48 are stored. As the information indicating a storage location of the element of cache data, a combination of the head address and the size of this element of cache data, for example, may be used. When processing a cache element in PDL data, the cache element interpreter 34-*c* determines by referring to the cache manager 38 whether or not cache data for this cache element has been registered in the cache 48. If cache data has been registered, the cache element interpreter 34-*c* does not generate cache data for this cache element. If cache data has not been registered, the cache element interpreter 34-*c* generates cache data for this cache element.

The logical page interpreter 34-*p* generates intermediate data from PDL data of each logical page. A logical page is a page in a logical sense defined in PDL data, in contrast to a physical page, which is one side of a physical print medium (such as paper). One or plural logical pages may be printed on one physical page in accordance with print settings. Hereinafter, the term "page" means a logical page unless otherwise stated.

While processing PDL data concerning a page, the logical page interpreter 34-*p* interprets rendering commands and parameters of objects other than cache elements, and generates intermediate data reflecting interpreting results. The logical page interpreter 34-*p* then integrates the generated intermediate data into intermediate data of this page. On the other hand, concerning a cache element in PDL data, instead of interpreting this cache element and generating intermediate data, the logical page interpreter 34-*p* determines a cache ID for specifying this cache element stored in the cache 48. Then, the logical page interpreter 34-*p* integrates a command to refer to the cache ID into intermediate data of this page, as intermediate data indicating this cache element. The intermediate data of each page generated by the logical page interpreter 34-*p* is sent to the intermediate data buffer 42 of the back end device 40.

When determining a cache ID of a cache element, the logical page interpreter 34-*p* employs the same method as that used by the cache element interpreter 34-*c*, for example, by generating a cache ID from a parameter group that specifies a rendering result of the cache element. Thus, the cache element interpreter 34-*c* and the logical page interpreter 34-*p* generate the same cache ID for the same cache element object.

In the example shown in FIG. 12, only one logical page interpreter 34-*p* is disposed in the front end device 30. Alternatively, plural logical page interpreters 34-*p* may be disposed in the front end device 30, and different pages may be allocated to these plural logical page interpreters 34-*p*, thereby allowing the plural logical page interpreters 34-*p* to perform interpreting processing in parallel.

The logical page interpreter 34-*p* and the cache element interpreter 34-*c* are implemented, for example, as processes executed by a CPU. For example, in a system configuration using a multicore CPU, the processes of the logical page interpreter 34-*p* and the cache element interpreter 34-*c* may be executed in the respective cores. In another example, the logical page interpreter 34-*p* and the cache element interpreter 34-*c* may be executed by different computers.

The rendering section 44 of the back end device 40 sequentially reads items of intermediate data of plural pages stored in the intermediate data buffer 42 in ascending order, and generates rendering data of a read page in accordance with a command of the intermediate data of the read page. If a command to refer to a cache ID in the cache 48 is included in the intermediate data of the read page, the rendering section 44 reads intermediate data (that is, intermediate data of a form) of this cache ID from the cache 48, and processes the read intermediate data so as to generate rendering data of the form. The rendering section 44 then combines the rendering data of the form with the rendering data of the read page.

Among elements to be cached, for certain cache elements, the processing efficiency is reduced if intermediate data of such cache elements are cached. In this case, such cache elements do not have to be cached. This will be discussed more specifically. In order to use the cache 48, the overhead for executing certain processing, such as registering of a cache element in the cache 48 and making a query about whether or not cache data is available, is generated. In the case of a very small element or an element having a simple configuration, it takes only a little time to perform processing for generating intermediate data. Accordingly, if the above-described overhead is considered, processing may be executed more quickly if the cache 48 is not utilized. Thus, elements that can be processed with higher efficiency if they are cached are cached, but on the other hand, elements that can be processed with higher efficiency if they are not cached are not cached. A determination as to whether or not an element will be processed with higher efficiency if it is cached may be made, for example, according to the following rules.

(Rule 1) If the number of pixels forming a bounding box of an element (a minimum rectangle that may surround a form of this element on a physical page) is greater than a predetermined number (referred to as a "pixel number threshold"), this form will be cached, and if the number of pixels is equal to or smaller than the pixel number threshold, this form will not be cached.

(Rule 2) If the number of objects included in an element is greater than a predetermined number (referred to as an "object number threshold"), a form of this element will be cached, and if the number of objects is equal to or smaller than the object number threshold, this form will not be cached.

(Rule 3) If the form of an element includes an image (bitmap) which is greater than a predetermined size (referred to as an "image size threshold"), this form will be cached, and if the form does not include such an image, this form will not be cached.

A determination as to whether the form of an element will be cached may be made by using one of the above-described rules 1 to 3, or by a combination of two or more of the rules 1 to 3. In the case of the use of a combination of two or more rules, if it is determined by using one rule that the form of an element will be cached, this form will be cached regardless of a determination result of another rule.

The values of the above-described pixel number threshold, object number threshold, and image size threshold are determined by the system configuration and the performance of the front end device 30 and the back end device 40, and may be determined by experiments or simulations.

The above-described operations performed by the logical page interpreter 34-*p* and the cache element interpreter 34-*c* are effective as long as spot colors are not used. If print data includes a cache element containing a spot color component, the following issue is presented if the above-described operations are performed.

If the above-described operations are applied to a cache element containing a spot color component, a cache element including a spot color component stored in the cache 48 is not eclipsed by a subsequent object having the same spot color. Additionally, the logical page interpreter 34-*p* replaces the cache element containing a spot color component by a command to refer to a cache ID of this cache element, and thus, this cache element does not eclipse a spot color object stored in a corresponding spot color plate spool 366 of the spot color flattening section 36. Accordingly, in the case of rasterizing a unit range (such as a page), when the rendering section 44 extracts this cache element from the cache 48 and rasterizes it, such a cache element overlaps another object having the same spot color within this unit range. As a result, the color of the overlapping portion turns out to be different from that when a printing operation is performed using a spot color plate.

In order to deal with this issue, in the second modified example, a cache element containing a spot color is not cached in the cache 48. Then, the logical page interpreter 34-*p* does not replace this cache element by a cache ID reference command. As a result, eclipse processing performed by the spot color flattening section 36 acts on this cache element.

Figure 13:
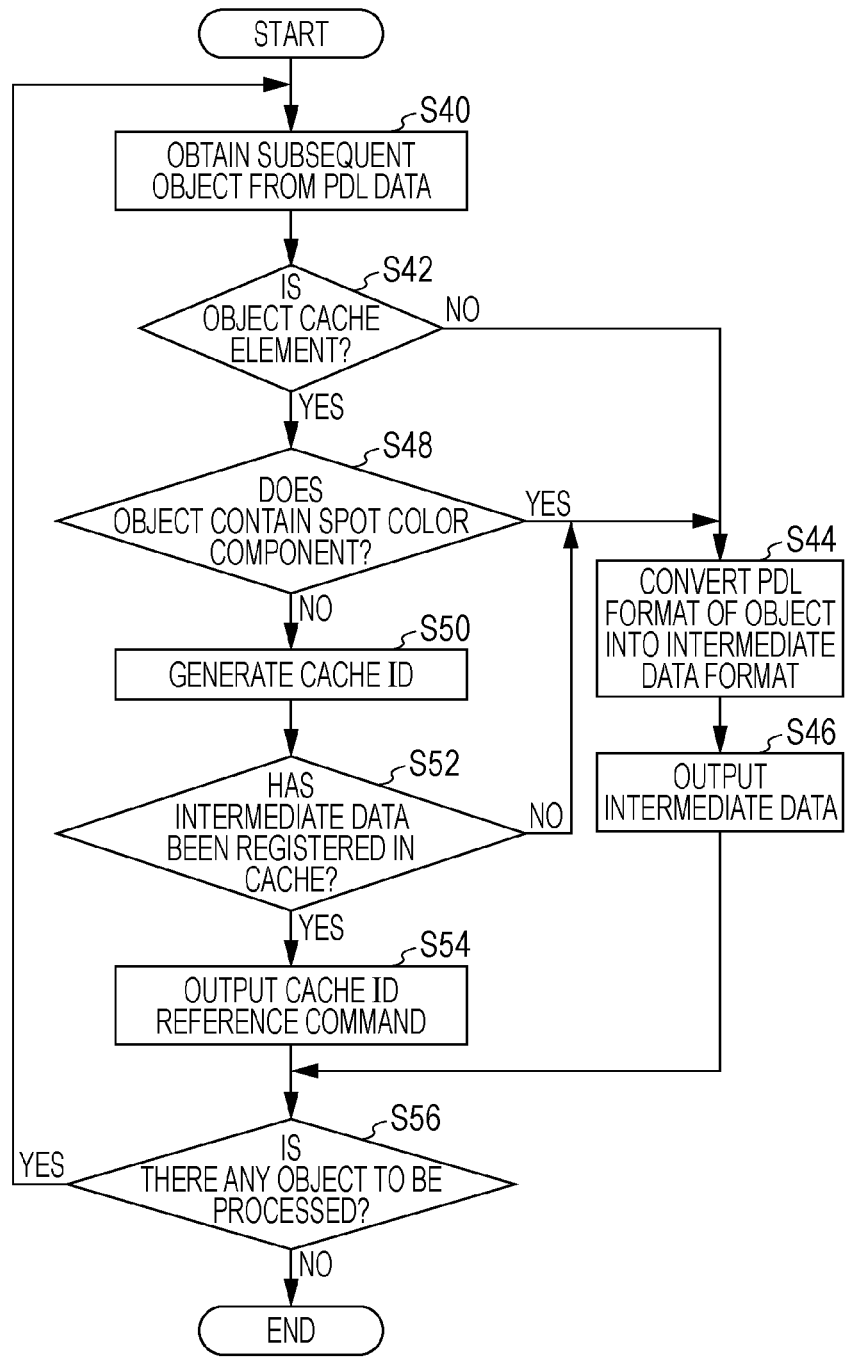
FIG. 13 is a flowchart illustrating an example of a procedure of processing performed by a logical page interpreter in the second modified example.

A procedure of processing performed by the logical page interpreter 34-*p* and that performed by the cache element interpreter 34-*c* in the second modified example are shown in FIGS. 13 and 14, respectively.

The procedure of processing performed by the logical page interpreter 34-*p* will first be discussed with reference to FIG. 13. In step S40, the logical page interpreter 34-*p* obtains an object at the head of print data described in a PDL. Then, the logical page interpreter 34-*p* determines in step S42 whether or not this object is a cache element. If this object is not a cache element, the process proceeds to step S44. In step S44, the logical page interpreter 34-*p* converts the PDL format of this object into the intermediate format. With this conversion, one object in the PDL data is divided into plural objects having smaller a granularity level in the intermediate data. In step S46, the intermediate data (plural objects in the intermediate data format) is output to the spot color flattening section 36. Then, it is determined in step S56 whether or not there is a subsequent object in the print data. If there is a subsequent object, the process returns to step S40, and the subsequent object is processed.

If the logical page interpreter 34-*p* determines in step S42 that the object is a cache element, it proceeds to step S48 to determine whether or not the cache element contains a spot color component. If the cache element does not contain a spot color component, the above-described issue is not presented even if the cache element is cached and reused. In this case, the process proceeds to step S50. In step S50, the logical page interpreter 34-*p* generates a cache ID by using the same ID generation rule as that of the cache element interpreter 34-*c*. In step S52, the logical page interpreter 34-*p* queries the cache manager 38 as to whether intermediate data corresponding to the cache ID is already stored in the cache 48. If the result of step S52 is YES, the process proceeds to step S54. In step S54, the logical page interpreter 34-*p* outputs a cache ID reference command described in the intermediate data format to a subsequent stage (spot color flattening section 36). Then, if it is determined in step S56 that there is a subsequent object in the print data, the process returns to step S40. If the input intermediate data is a cache ID reference command, the spot color flattening section 36 simply outputs the intermediate data to the back end device 40.

If it is determined in step S52 that intermediate data corresponding to the cache ID generated in step S50 is not yet stored in the cache 48, even if a cache ID reference command is output, intermediate data corresponding to the cache ID may not have been stored in the cache 48 when the back end device 40 processes this command. Thus, in this example, the process proceeds to step S44. In step S44, the logical page interpreter 34-*p* converts the PDL format of the cache element into the intermediate data format. Then, in step S46, the logical page interpreter 34-*p* outputs the intermediate data to the subsequent stage.

A cache element in PDL data may be constituted, not by real data indicating the cache element described in a PDL, but by reference data indicating the real data (for example, a form ID indicating a form). In this case, the logical page interpreter 34-*p* detects real data from the PDL data of a print job and manages the detected real data in association with reference data indicating the real data. Accordingly, if a cache element is reference data and if the result of step S52 is NO, the logical page interpreter 34-*p* obtains real data indicating the reference data and converts the real data into intermediate data in step S44.

If it is determined in step S48 that the cache element, which is an object to be processed, contains a spot color component, the process proceeds to step S44. In step S44, the logical page interpreter 34-*p* converts the PDL format of the cache element into the intermediate data format. Then, in step S46, the logical page interpreter 34-*p* outputs the intermediate data to the spot color flattening section 36.

The procedure of processing performed by the cache element interpreter 34-*c* in the second modified example will now be discussed below with reference to FIG. 14.

In step S60, the cache element interpreter 34-*c* obtains an object at the head of print data described in a PDL. Then, the cache element interpreter 34-*c* determines in step S62 whether or not this object is a cache element. If this object is not a cache element, the cache element interpreter 34-*c* does not perform any processing on the cache element and proceeds to step S74 to determine whether or not there is a subsequent object in the print data. If there is a subsequent object, the process returns to step S60, and the subsequent object is processed.

If the cache element interpreter 34-*c* determines in step S62 that the object is a cache element, the cache element interpreter 34-*c* proceeds to step S64 to determine whether or not the cache element contains a spot color component. If the cache element contains a spot color component, the above-described issue is presented if the cache element is cached. Accordingly, the cache element interpreter 34-*c* does not perform any processing on this cache element and proceeds to step S74 to determine whether or not there is a subsequent object in the print data. If there is a subsequent object, the process returns to step S60, and the subsequent object is processed. If it is determined in step S64 that the cache element does not contain a spot color component, the process proceeds to step S66. In step S66, the cache element interpreter 34-*c* generates a cache ID of this cache element. In step S68, the cache element interpreter 34-*c* queries the cache manager 38 as to whether intermediate data corresponding to the cache ID is already stored in the cache 48. If the result of step S68 is NO, the process proceeds to step S70. In step S70, the cache element interpreter 34-*c* converts the PDL format of the cache element into the intermediate data format. Then, in step S72, the cache element interpreter 34-*c* registers the intermediate data in the cache 48 in association with the cache ID. The process then proceeds to step S74.

If it is determined in step S68 that intermediate data corresponding to the cache ID generated in step S66 is already stored in the cache 48, the process proceeds to step S74 by skipping steps S70 and S72 since it is not necessary to register the intermediate data in the cache 48 twice.

In the second modified example, a cache element containing a spot color component is not cached in the cache 48. Instead, the cache element is converted into intermediate data by the logical page interpreter 34-*p* and is supplied to the spot color flattening section 36. Accordingly, a cache element containing a spot color component is subjected to eclipse processing, and is accumulated in the corresponding spot color plate spool 366.

[Third Modified Example]

In a third modified example, the issue handled in the second modified example is handled from a different approach from that of the second modified example.

In the second modified example, the cache element interpreter 34-*c* does not cache a cache element containing a spot color component in the cache 48, and instead, the logical page interpreter 34-*p* converts PDL data of such a cache element into intermediate data. On the other hand, in the third modified example, instead of handling a cache element containing a spot color component as a special element, the cache element interpreter 34-*c* and the logical page interpreter 34-*p* handle a cache element containing a spot color component in a similar manner to a cache element without a spot color component. Then, the spot color flattening section 36 accesses the cache 48 of the back end device 40, and replaces the cache ID by intermediate data, thereby making it possible to apply eclipse processing to the cache element having a spot color component.

The system configuration of the third modified example is similar to that of the second modified example shown in FIG. 12, except that the spot color flattening section 36 refers to the cache 48.

A procedure of processing performed by the spot color flattening section 36 in the third modified example is shown in FIG. 15. This procedure is a modified version of the procedure of the processing performed by the spot color flattening section 36 in the above-described exemplary embodiment shown in FIGS. 7A and 7B.

In step S10, the spot color flattening section 36 obtains a new object and sets it to be a current object. Then, the spot color flattening section 36 determines in step S80 whether or not the current object is a cache ID reference command. If the result of step S80 is NO, the process proceeds to step S12 of FIG. 7A, and thereafter processing similar to that of FIGS. 7A and 7B is executed.

If the spot color flattening section 36 determines in step S80 that the current object is a cache ID reference command, it proceeds to step S82. In step S82, the spot color flattening section 36 accesses the cache 48 and determines whether or not color data of intermediate data corresponding to a cache ID indicated by the cache ID reference command contains a spot color component. If the result of step S82 is NO, the process proceeds to step S84. In step S84, the spot color flattening section 36 outputs the current object (cache ID reference command) to the back end device 40. The process then proceeds to step S24 of FIG. 7A.

If it is determined in step S82 that the color data of the intermediate data corresponding to the cache ID contains a spot color component, the process proceeds to step S86. In step S86, the spot color flattening section 36 obtains the intermediate data from the cache 48 and sets it to be a current object. Then, the process proceeds to step S12 of FIG. 7A, and processing similar to that shown in FIGS. 7A and 7B is executed.

In the third modified example, the spot color flattening section 36 replaces a cache ID reference command indicating cache data of an object containing a spot color component by intermediate data of this object. Then, the intermediate data of this object is subjected to eclipse processing and is accumulated in the corresponding spot color plate spool 366.

The foregoing description of the exemplary embodiment and modified examples of the present invention have been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print data processing apparatus comprising:
at least one memory that stores therein a spot color element, which is an image element that has a spot color component and does not have any basic color component and is comprised in intermediate data; and
at least one hardware processor in communication with the at least one memory and that:
performs, when a new image element is input in accordance with a rendering order, flattening processing for separating the new image element into a basic color element that has a basic color component and does not have any spot color component and a spot color element that has a spot color component and does not have any basic color component, for updating a configuration of each spot color element stored in the at least one memory to a configuration from which a portion of the spot color element hidden by a configuration of a new spot color element separated from the new image element is removed, and for storing the new spot color element in the at least one memory,
converts, after spot color elements obtained by separating all image elements included in each unit of output are processed by the flattening processing, the spot color elements stored in the at least one memory into corresponding basic color components, and
outputs the converted basic color components, converted from the spot color elements stored in the at least one memory,
wherein the at least one hardware processor further implements:
a logical page interpreter to interpret data concerning a logical page and outputs an interpreting result; and
a cache interpreter to interpret a cache element included in the logical page and stores an interpreting result in a cache,
wherein if the cache element included in the logical page does not include any spot color, the cache interpreter performs cache processing for interpreting the cache element and for storing an image element obtained as a result of interpreting the cache element in the cache by associating the image element with cache identification information which is generated from the cache element according to a predetermined generation rule, and if the cache element included in the logical page includes a spot color, the cache interpreter does not perform the cache processing for the cache element,
wherein if the cache element included in the logical page does not include any spot color, the logical page interpreter performs cache handling processing for generating, instead of interpreting the cache element, a cache reference command including cache identification information generated from the cache element according to the predetermined generation rule and for integrating the generated cache reference command as an interpreting result of the cache element into an interpreting result of the logical page, and if the cache element included in the logical page includes a spot color, instead of performing the cache handing processing, the logical page interpreter interprets the cache element and integrates an image element obtained as a result of interpreting the cache element into an integrating result of the logical page, and wherein the flattening processing further receives and processes image elements which are output from the logical page interpreter as an interpreting result in accordance with the rendering order.

2. A print data processing apparatus comprising:
at least one memory that:
stores therein a spot color element, which is an image element that has a spot color component and does not have any basic color component and is comprised in intermediate data, and
stores therein a basic color element, which is an image element that has a basic color component and does not have any spot color component; and
at least one hardware processor in communication with the at least one memory and that:
performs, when a new image element is input in accordance with a rendering order, flattening processing for separating the new image element into a basic color element that has a basic color component and does not have any spot color component and a spot color element that has a spot color component and does not have any basic color component, for updating a configuration of each spot color element stored in the at least one memory to a configuration from which a portion of the spot color element hidden by a configuration of a new spot color element separated from the new image element is removed, for updating a configuration of each basic color element stored in the at least one memory to a configuration from which a portion of the basic color element hidden by a configuration of a new basic color element separated from the new image element is removed, for storing the new spot color element in the at least one memory, and for storing the new basic color element in the at least one memory,
converts, after spot color elements and basic color elements obtained by separating all image elements included in each unit of output are stored in the at least one memory, the spot color elements stored in the at least one memory into corresponding basic color components, and
outputs the converted basic color components, converted from the sport color elements stored in the at least one memory, and the basic color elements stored in the at least one memory in accordance with a superposing order of the spot color component and the basic color component used in printing,
wherein the at least one hardware processor further implements:
a logical page interpreter to interpret data concerning a logical page and outputs an interpreting result; and
a cache interpreter to interpret a cache element included in the logical page and stores an interpreting result in a cache,
wherein if the cache element included in the logical page does not include any spot color, the cache interpreter performs cache processing for interpreting the cache element and for storing an image element obtained as a result of interpreting the cache element in the cache by associating the image element with cache identification information which is generated from the cache element according to a predetermined generation rule, and if the cache element included in the logical page includes a spot color, the cache interpreter does not perform the cache processing for the cache element,
wherein if the cache element included in the logical page does not include any spot color, the logical page interpreter performs cache handling processing for generating, instead of interpreting the cache element, a cache reference command including cache identification information generated from the cache element according to the predetermined generation rule and for integrating the generated cache reference command as an interpreting result of the cache element into an interpreting result of the logical page, and if the cache element included in the logical page includes a spot color, instead of performing the cache handing processing, the logical page interpreter interprets the cache element and integrates an image element obtained as a result of interpreting the cache element into an integrating result of the logical page, and wherein the flattening processing further receives and processes image elements which are output from the logical page interpreter as an interpreting result in accordance with the rendering order.

3. The print data processing apparatus according to claim 1, wherein:

the at least one memory comprises a plurality of spot color regions respectively corresponding to each of a plurality of spot color components; and when separating the new image element, the at least one hardware processor further:

generates, for each of the plurality of spot color components, a spot color element that has a certain spot color component only among the plurality of spot color components, updates a configuration of each spot color element stored in the spot color region, from among the plurality of spot color regions, corresponding to the certain spot color component to a configuration from which a portion of the spot color element hidden by a configuration of the spot color element having the certain spot color component separated from the new image element is removed, stores the spot color element separated from the new image element in the corresponding spot color region, and outputs converted basic color components, converted from each spot color element stored in the spot color region corresponding to each of the plurality of spot color components, in accordance with a superposing order of the spot color components used in printing.

4. The print data processing apparatus according to claim 2, wherein:

the at least one memory comprises a plurality of spot color regions respectively corresponding to each of a plurality of spot color components; and when separating the new image element, the at least one hardware processor further:

generates, for each of the plurality of spot color components, a spot color element that has a certain spot color component only among the plurality of spot color components, updates a configuration of each spot color element stored in the spot color region, from among the plurality of spot color regions, corresponding to the certain spot color component to a configuration from which a portion of the spot color element hidden by a configuration of the spot color element having the certain spot color component separated from the new image element is removed, stores the spot color element separated from the new image element in the corresponding spot color region, and outputs converted basic color components, converted from each spot color element stored in the spot color region corresponding to each of the plurality of spot color components, in accordance with a superposing order of the spot color components used in printing.

5. The print data processing apparatus according to claim 2, wherein:

the at least one memory is provided for each of a plurality of basic color components; and when separating the new image element, the at least one hardware processor further:

generates, for each of the plurality of basic color components, a basic color element that has a certain basic color component only among the plurality of basic color components, updates a configuration of each basic color element stored in the at least one memory corresponding to the certain basic color component to a configuration from which a portion of the basic color element hidden by a configuration of the basic color element having the certain basic color component separated from the new image element is removed, stores the basic color element separated from the new image element in the at least one memory, and outputs converted basic color components, converted from each spot color element stored in the at least one memory, and each basic color element stored in the at least one memory corresponding to each of the plurality of basic color components in accordance with a superposing order of the spot color component and the basic color components used in printing.

6. The print data processing apparatus according to claim 4, wherein:

the at least one memory is provided for each of a plurality of basic color components; and when separating the new image element, the at least one hardware processor further:

generates, for each of the plurality of basic color components, a basic color element that has a certain basic color component only among the plurality of basic color components, updates a configuration of each basic color element stored in the at least one memory corresponding to the certain basic color component to a configuration from which a portion of the basic color element hidden by a configuration of the basic color element having the certain basic color component separated from the new image element is removed, stores the basic color element separated from the new image element in the at least one memory, and outputs converted basic color components, converted from each spot color element stored in the at least one memory, and each basic color element stored in the at least one memory corresponding to each of the plurality of basic color components in accordance with a superposing order of the spot color components and the basic color components used in printing.

7. The print data processing apparatus according to claim 1, wherein:

the cache interpreter interprets the cache element included in the logical page and stores an image element obtained as a result of interpreting the cache element in the cache by associating the image element with cache identification information which is generated from the cache element according to a predetermined generation rule, instead of interpreting the cache element included in the logical page, the logical page interpreter generates a cache reference command including cache identification information generated from the cache element according to the predetermined generation rule, and integrates the generated cache reference command as an interpreting result of the cache element into an interpreting result of the logical page, and the at least one hardware processor further receives and processes image elements which are output from the logical page interpreter as an interpreting result in accordance with the rendering order, and if a received image element is found to be the cache reference command, the at least one hardware processor determines whether or not an image element stored in the cache corresponding to the cache identification information included in the cache reference command includes a spot color component, and if the at least one hardware processor determines that the image element includes a spot color, the at least one hardware processor obtains the image element from the cache and performs the flattening processing on the image element, and if the at least one hardware processor determines that the image element does not include a spot color, the at least one hardware processor outputs the cache reference command.

8. The print data processing apparatus according to claim 2, wherein:

the cache interpreter interprets the cache element included in the logical page and stores an image element obtained as a result of interpreting the cache element in the cache by associating the image element with cache identification information which is generated from the cache element according to a predetermined generation rule, instead of interpreting the cache element included in the logical page, the logical page interpreter generates a cache reference command including cache identification information generated from the cache element according to the predetermined generation rule, and integrates the generated cache reference command as an interpreting result of the cache element into an interpreting result of the logical page, and the at least one hardware processor further receives and processes image elements which are output from the logical page interpreter as an interpreting result in accordance with the rendering order, and if a received image element is found to be the cache reference command, the at least one hardware processor determines whether or not an image element stored in the cache corresponding to the cache identification information included in the cache reference command includes a spot color component, and if the at least one hardware processor determines that the image element includes a spot color, the at least one hardware processor obtains the image element from the cache and performs the flattening processing on the image element, and if the at least one hardware processor determines that the image element does not include a spot color, the at least one hardware processor outputs the cache reference command.

9. The print data processing apparatus according to claim 3, wherein:

the cache interpreter interprets the cache element included in the logical page and stores an image element obtained as a result of interpreting the cache element in the cache by associating the image element with cache identification information which is generated from the cache element according to a predetermined generation rule, instead of interpreting the cache element included in the logical page, the logical page interpreter generates a cache reference command including cache identification information generated from the cache element according to the predetermined generation rule, and integrates the generated cache reference command as an interpreting result of the cache element into an interpreting result of the logical page, and the at least one hardware processor further receives and processes image elements which are output from the logical page interpreter as an interpreting result in accordance with the rendering order, and if a received image element is found to be the cache reference command, the at least one hardware processor determines whether or not an image element stored in the cache corresponding to the cache identification information included in the cache reference command includes a spot color component, and if the at least one hardware processor determines that the image element includes a spot color, the at least one hardware processor obtains the image element from the cache and performs the flattening processing on the image element, and if the at least one hardware processor determines that the image element does not include a spot color, the at least one hardware processor outputs the cache reference command.

10. The print data processing apparatus according to claim 4, wherein:

the cache interpreter interprets the cache element included in the logical page and stores an image element obtained as a result of interpreting the cache element in the cache by associating the image element with cache identification information which is generated from the cache element according to a predetermined generation rule, instead of interpreting the cache element included in the logical page, the logical page interpreter generates a cache reference command including cache identification information generated from the cache element according to the predetermined generation rule, and integrates the generated cache reference command as an interpreting result of the cache element into an interpreting result of the logical page, and the at least one hardware processor further receives and processes image elements which are output from the logical page interpreter as an interpreting result in accordance with the rendering order, and if a received image element is found to be the cache reference command, the at least one hardware processor determines whether or not an image element stored in the cache corresponding to the cache identification information included in the cache reference command includes a spot color component, and if the at least one hardware processor determines that the image element includes a spot color, the at least one hardware processor obtains the image element from the cache and performs the flattening processing on the image element, and if the at least one hardware processor determines that the image element does not include a spot color, the at least one hardware processor outputs the cache reference command.

11. The print data processing apparatus according to claim 5, wherein:

the cache interpreter interprets the cache element included in the logical page and stores an image element obtained as a result of interpreting the cache element in the cache by associating the image element with cache identification information which is generated from the cache element according to a predetermined generation rule, instead of interpreting the cache element included in the logical page, the logical page interpreter generates a cache reference command including cache identification information generated from the cache element according to the predetermined generation rule, and integrates the generated cache reference command as an interpreting result of the cache element into an interpreting result of the logical page, and the at least one hardware processor further receives and processes image elements which are output from the logical page interpreter as an interpreting result in accordance with the rendering order, and if a received image element is found to be the cache reference command, the at least one hardware processor determines whether or not an image element stored in the cache corresponding to the cache identification information included in the cache reference command includes a spot color component, and if the at least one hardware processor determines that the image element includes a spot color, the at least one hardware processor obtains the image element from the cache and performs the flattening processing on the image element, and if the at least one hardware processor determines that the image element does not include a spot color, the at least one hardware processor outputs the cache reference command.

12. The print data processing apparatus according to claim 6, wherein:

the cache interpreter interprets the cache element included in the logical page and stores an image element obtained as a result of interpreting the cache element in the cache by associating the image element with cache identification information which is generated from the cache element according to a predetermined generation rule, instead of interpreting the cache element included in the logical page, the logical page interpreter generates a cache reference command including cache identification information generated from the cache element according to the predetermined generation rule, and integrates the generated cache reference command as an interpreting result of the cache element into an interpreting result of the logical page, and the at least one hardware processor further receives and processes image elements which are output from the logical page interpreter as an interpreting result in accordance with the rendering order, and if a received image element is found to be the cache reference command, the at least one hardware processor determines whether or not an image element stored in the cache corresponding to the cache identification information included in the cache reference command includes a spot color component, and if the at least one hardware processor determines that the image element includes a spot color, the at least one hardware processor obtains the image element from the cache and performs the flattening processing on the image element, and if the at least one hardware processor determines that the image element does not include a spot color, the at least one hardware processor outputs the cache reference command.

13. The print data processing apparatus according to claim 1, wherein if a knockout method is specified in the new image element as a manner of superposing the new image element on top of another image element, when separating the new image element, even if the new image element does not include the spot color component, the flattening processing further generates a spot color element having a value of 0 concerning the spot color component, and updates a configuration of each spot color element stored in the at least one memory to a configuration from which a portion of the spot color element hidden by a configuration of the generated spot color element is removed.

14. A non-transitory computer readable medium storing a program causing a computer to execute a process, the process comprising:

performing, when a new image element is input in accordance with a rendering order, flattening processing for separating the new image element into a basic color element that has a basic color component and does not have any spot color component and a spot color element that has a spot color component and does not have any basic color component and is comprised in intermediate data, for updating a configuration of each spot color element stored in at least one memory to a configuration from which a portion of the spot color element hidden by a configuration of a new spot color element separated from the new image element is removed, and for storing the new spot color element in the at least one memory; and converting, after spot color elements obtained by separating all image elements included in each unit of output are processed by the flattening processing, the spot color elements stored in the at least one memory into corresponding basic color components, and outputting the converted basic color components, converted from the spot color elements stored in the at least one memory, wherein the process further comprises:

interpreting data concerning a logical page and outputting an interpreting result; and interpreting a cache element included in the logical page and storing an interpreting result in a cache, wherein if the cache element included in the logical page does not include any spot color, the interpreting the cache element comprises performing cache processing for interpreting the cache element and for storing an image element obtained as a result of interpreting the cache element in the cache by associating the image element with cache identification information which is generated from the cache element according to a predetermined generation rule, and if the cache element included in the logical page includes a spot color, the interpreting the cache element comprises not performing the cache processing for the cache element, wherein if the cache element included in the logical page does not include any spot color, the interpreting the data concerning the logical page comprises performing cache handling processing for generating, instead of interpreting the cache element, a cache reference command including cache identification information generated from the cache element according to the predetermined generation rule and for integrating the generated cache reference command as an interpreting result of the cache element into an interpreting result of the logical page, and if the cache element included in the logical page includes a spot color, instead of performing the cache handing processing, the interpreting the data concerning the logical page comprises interpreting the cache element and integrates an image element obtained as a result of interpreting the cache element into an integrating result of the logical page, and wherein the flattening processing further receives and processes image elements which are output from the logical page interpreter as an interpreting result in accordance with the rendering order.

15. The print data processing apparatus according to claim 1, wherein image elements for which the flattening processing is performed, including the new image element, are comprised in intermediate data having a granularity level between page description language (PDL) data and rendering data output to a printer.

* * * * *